(12) United States Patent
Li et al.

(10) Patent No.: US 11,868,314 B2
(45) Date of Patent: *Jan. 9, 2024

(54) FILE PROCESSING METHOD AND MOBILE TERMINAL

(71) Applicant: Huawei Technologies Co., Ltd., Shenzhen (CN)

(72) Inventors: Tangsuo Li, Shenzhen (CN); Shaojun Chen, Shanghai (CN); Xinjian Wang, Shanghai (CN); Chengfu Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,243

(22) Filed: Sep. 7, 2022

(65) Prior Publication Data

US 2023/0065189 A1 Mar. 2, 2023

Related U.S. Application Data

(63) Continuation of application No. 16/623,278, filed as application No. PCT/CN2017/100854 on Sep. 7, 2017, now Pat. No. 11,468,008.

(30) Foreign Application Priority Data

Jun. 16, 2017 (CN) .......................... 201710459557.5

(51) Int. Cl.
*G06F 16/16* (2019.01)
*H04M 1/247* (2021.01)
*H04M 1/72403* (2021.01)

(52) U.S. Cl.
CPC .......... *G06F 16/168* (2019.01); *G06F 16/162* (2019.01); *G06F 16/164* (2019.01); *H04M 1/2477* (2013.01); *H04M 1/72403* (2021.01)

(58) Field of Classification Search
CPC .... G06F 16/168; G06F 16/162; G06F 16/164; G06F 11/14; H04M 1/2477; H04M 1/72403
See application file for complete search history.

(56) References Cited

U.S. PATENT DOCUMENTS 7,921,083 B2 4/2011 Komori et al.
8,738,571 B1 * 5/2014 Abdulla ................ G06F 16/162
707/626

(Continued)

FOREIGN PATENT DOCUMENTS

CN 101273354 A 9/2008
CN 101341480 A 1/2009

(Continued)

OTHER PUBLICATIONS

Deng, B., "The Analysis and Research of Principle for Recycle Bin," (Information and Computer Dept., Sichuan Economic Management Inst., Chengdu, 610041), Jul. 10, 2000, 13 pages.

*Primary Examiner* — Farid Seyedvosoghi
(74) *Attorney, Agent, or Firm* — Conley Rose, P.C.

(57) ABSTRACT

A file processing method includes obtaining a first operation from a user, displaying a first file on a first screen of a first application, obtaining a second operation from the user on the first screen, displaying, in response to the second operation, the first file on a recycle bin screen of the first application, deleting, by the mobile terminal, a first data table, where the first file is invisible to the user on the recycle bin screen of the first application due to deletion of the first data table, obtaining a third operation from the user, and generating, in response to the third operation, a second data table, where the first file is visible to the user on the recycle bin screen of the first application due to existence of the second data table.

20 Claims, 32 Drawing Sheets

(56) References Cited

U.S. PATENT DOCUMENTS

| | | | |
|---|---|---|---|
| 10,599,615 B2* | 3/2020 | Hwang | G06F 16/162 |
| 2006/0218197 A1 | 9/2006 | Makela et al. | |
| 2007/0143351 A1 | 6/2007 | Sawaya et al. | |
| 2008/0183802 A1 | 7/2008 | Gray et al. | |
| 2008/0228693 A1 | 9/2008 | Esser et al. | |
| 2010/0205154 A1 | 8/2010 | Beliczynski | |
| 2011/0113076 A1 | 5/2011 | Jo et al. | |
| 2013/0018852 A1 | 1/2013 | Barton et al. | |
| 2013/0173559 A1 | 7/2013 | Chen | |
| 2013/0262395 A1 | 10/2013 | Levinshtein et al. | |
| 2014/0337296 A1 | 11/2014 | Knight | |
| 2017/0364528 A1 | 12/2017 | Hwang et al. | |
| 2018/0239777 A1* | 8/2018 | He | G06F 3/04817 |
| 2020/0183885 A1 | 6/2020 | Li et al. | |

FOREIGN PATENT DOCUMENTS

| | | |
|---|---|---|
| CN | 101546311 A | 9/2009 |
| CN | 102307221 A | 1/2012 |
| CN | 103186598 A | 7/2013 |
| CN | 103197993 A | 7/2013 |
| CN | 103713799 A | 4/2014 |
| CN | 103973731 A | 8/2014 |
| CN | 104166720 A | 11/2014 |
| CN | 105653397 A | 6/2016 |
| CN | 105653582 A | 6/2016 |
| CN | 105739826 A | 7/2016 |
| CN | 105930436 A | 9/2016 |
| CN | 106294012 A | 1/2017 |
| CN | 106354884 A | 1/2017 |
| IN | 101287190 A | 10/2008 |
| JP | 2002366410 A | 12/2002 |
| JP | 2004303053 A | 10/2004 |
| JP | 2007279922 A | 10/2007 |
| JP | 2007316707 A | 12/2007 |
| JP | 2009104466 A | 5/2009 |
| JP | 2009267948 A | 11/2009 |
| JP | 2017078994 A | 4/2017 |
| JP | 6860704 B2 | 4/2021 |
| WO | 2014117513 A1 | 8/2014 |
| WO | 2015078370 A1 | 6/2015 |

* cited by examiner

FILE PROCESSING METHOD AND MOBILE TERMINAL

CROSS-REFERENCE TO RELATED APPLICATIONS

This is a continuation of U.S. patent application Ser. No. 16/623,278, filed on Dec. 16, 2019, which is a U.S. National Stage of International Patent Application No. PCT/CN2017/100854, filed on Sep. 7, 2017, which claims priority to Chinese Patent Application No. 201710459557.5 filed on Jun. 16, 2017. All of the aforementioned applications are hereby incorporated by reference in their entireties.

TECHNICAL FIELD

This application relates to the field of terminal application, and in particular, to a file processing method and a mobile terminal.

BACKGROUND

As smartphones become popular and photographing functions of the smartphones become increasingly powerful, more users use smartphones as a photographing tool and a storage medium for photos and videos. Therefore, large quantities of photos and videos are usually stored on a mobile phone. When a user clears photos or performs other operations, some important photos may be mistakenly deleted. For an ordinary mobile phone, after a photo is deleted from an album, the photo is permanently deleted, and cannot be recovered by the user.

To prevent a photo from permanent loss because of a user's deletion by mistake, a recycle bin function is added to some mobile phones. A picture or video deleted by a user is moved to a recycle bin, and after the photo or video is moved to the recycle bin, the photo or video is not cleared until a period of time elapses. During this period of time, the user can recover the photo or video from the recycle bin to a source album.

SUMMARY

Embodiments of this application provide a file processing method and a mobile terminal, to display a multimedia file on a recycle bin screen after application data is cleared, so that a user can permanently delete or recover the multimedia file on the recycle bin screen, thereby improving user experience.

In view of this, a first aspect of this application provides a file processing method, and the method includes: entering, by a user, a first operation on a mobile terminal, and in response to the first operation, displaying, by the mobile terminal, a first file on a first screen of a first application; and entering, by the user, a second operation entered by the user on the first screen, and in response to the second operation, skipping displaying, by the mobile terminal, the first file on the first screen of the first application, and displaying the first file on a recycle bin screen; deleting, by mobile terminal, a first data table of the first application, where the first file is invisible to the user on the recycle bin screen of the first application due to deletion of the first data table, that is, the mobile terminal is unable to display the first file on the recycle bin screen; and after the mobile terminal deletes the first data table, entering, by the user, a third operation on the mobile terminal, and in response to the third operation, generating, by the mobile terminal, a second data table, where the first file is visible to the user on the recycle bin screen of the first application due to deletion of the second data table, that is, the mobile terminal is able to display the first file on the recycle bin screen.

The first data table and the second data table are recycle bin data tables, and are used to record metadata of a file belonging to a recycle bin. The first application displays, based on the recycle bin data tables, the file belonging to the recycle bin. The first data table is originally stored on the mobile terminal, and the second data table is generated after the first data table is deleted. Types of metadata recorded in the two data tables may be the same or different.

In this embodiment, after the recycle bin data table is deleted, the mobile terminal can generate a new recycle bin data table, so that the mobile terminal can still display the first file on the recycle bin screen after application data is cleared, and the user can permanently delete or recover the first file on the recycle bin screen, thereby improving user experience.

With reference to the first aspect of this application, in a first implementation of the first aspect of this application, before the mobile terminal obtains the second operation entered by the user on the first screen, the first file belongs to a first album of the first application; and after the mobile terminal obtains the second operation entered by the user on the first screen, the first file belongs to a recycle bin album of the first application.

After the mobile terminal displays the first file on the recycle bin screen, the user enters a fourth operation on the recycle bin screen to recover the first file. In response to the fourth operation, the mobile terminal changes an album to which the first file belongs from the recycle bin album to the first album, and the mobile terminal can display the first file on a screen corresponding to the first album.

In this embodiment, after application data is cleared, the user can recover, on the recycle bin screen, the first file to a source album for displaying, thereby improving flexibility of the solution.

With reference to the first aspect of this application, in a second implementation of the first aspect of this application, before the mobile terminal obtains the second operation entered by the user on the first screen, the first file belongs to a first album of the first application; and after the mobile terminal obtains the second operation entered by the user on the first screen, the first file belongs to a recycle bin album of the first application.

After the mobile terminal displays the first file on the recycle bin screen, the user enters a fourth operation on the recycle bin screen to recover the first file. In response to the fourth operation, the mobile terminal changes an album to which the first file belongs from the recycle bin album to a target album, and the mobile terminal can display the first file on a screen corresponding to the target album.

The target album is a system- or user-specified album, and is used by the user to manage a multimedia file recovered on the recycle bin screen.

In this embodiment, after application data is cleared, the user can recover, on the recycle bin screen, the first file to a system-specified album for displaying, thereby improving flexibility of the solution.

With reference to the first aspect of this application, in a third implementation of the first aspect of this application, after generating the second data table, the mobile terminal displays the first file on the recycle bin screen of the first application, the user enters a fifth operation on the recycle bin screen to permanently delete the first file. In response to the operation, the mobile terminal permanently deletes the first file, that is, deletes the first file from the mobile terminal. The first file is no long stored on the mobile terminal after being permanently deleted.

In this embodiment, after application data is cleared, the user can permanently delete the first file to release storage space, thereby improving user experience.

With reference to the first aspect of this application, in a fourth implementation of the first aspect of this application, after generating the second data table, the mobile terminal displays the first file on the recycle bin screen of the first application. The user enters a sixth operation on the recycle bin screen to view metadata of the first file. In response to the operation, the mobile terminal displays the metadata of the first file. The metadata may include at least one of the following: an original filename of the first file, an original file identifier of the first file, a deletion time of the first file, a source storage path of the first file, a current storage path of the first file, a date taken time of the first file, a picture orientation of the first file, a cloud globally unique identifier of the first file, a hash value of the first file, and a cloud identifier of a source album to which the first file belongs.

The original filename is a filename of the first file before the mobile terminal obtains the second operation. The original file identifier is an identifier, in a corresponding data table, of the first file before the mobile terminal obtains the second operation. The source storage path is a storage path of the first file before the mobile terminal obtains the second operation. The current storage path is a storage path of the first file when the mobile terminal obtains the sixth operation. The source album is an album to which the first file belongs before the mobile terminal obtains the second operation.

In this embodiment, after application data is cleared, the user can view the metadata of the first file on the recycle bin screen to learn details of the first file, thereby improving user experience.

With reference to any one of the first aspect of this application and the first to the fourth implementations of the first aspect, in a fifth implementation of the first aspect of this application, in response to the third operation, the mobile terminal may further execute the following procedure: skipping displaying, by the mobile terminal on the recycle bin screen of the first application, a file that is the same as the first file and that is stored on a cloud server.

In this embodiment, the mobile terminal skips displaying the file the same as the first file on the recycle bin screen, so as to avoid repeated displaying and thereby improve user experience.

With reference to any one of the first aspect of this application and the first to the fifth implementations of the first aspect, in a sixth implementation of the first aspect of this application, after generating the second data table, the mobile terminal may display a selection screen. The user enters a seventh operation on the selection screen to select a file that needs to be displayed on the recycle bin screen. In response to the operation, the mobile terminal displays, on the recycle bin screen of the first application, the first file selected by the user. For files not selected by the user, these files may be permanently deleted from the mobile terminal.

In this embodiment, after application data is cleared, the mobile terminal may determine, based on a selection of the user, a file that needs to be displayed in the recycle bin, thereby improving flexibility of the solution.

With reference to any one of the first aspect of this application and the first to the sixth implementations of the first aspect, in a seventh implementation of the first aspect of this application, in response to the second operation, the mobile terminal may further execute the following procedures: changing, by the mobile terminal, a storage location of the first file from a first directory to a second directory, and changing a filename of the first file from a first name to a second name, where the second directory is used to store a file displayed on the recycle bin screen of the first application. After the mobile terminal changes the storage location of the first file from the first directory to the second directory, the mobile terminal can display the first file on the recycle bin screen.

This embodiment provides a specific manner of displaying the first file on the recycle bin screen by the mobile terminal, improving feasibility of the solution.

With reference to the seventh implementation of the first aspect of this application, in an eighth implementation of the first aspect of this application, the second name is a target character string obtained by encoding the metadata of the first file by using a preset coding scheme.

This embodiment provides a manner in which the mobile terminal may store the metadata of the first file in the second name by using the preset coding scheme, providing a manner of storing the metadata after the mobile terminal obtains a delete instruction, and improving feasibility of the solution.

With reference to the eighth implementation of the first aspect of this application, in a ninth implementation of the first aspect of this application, the mobile terminal may specifically generate the second data table in the following manner: obtaining, by the mobile terminal, the metadata of the first file by decoding the second name by using the preset coding scheme, and generating the second data table based on the metadata obtained through decoding.

This embodiment provides a manner of generating the second data table, improving feasibility of the solution.

With reference to the seventh implementation of the first aspect of this application, in a tenth implementation of the first aspect of this application, the second name is the deletion time of the first file; and in the process of changing, by the mobile terminal, the storage location of the first file from the first directory to the second directory, the mobile terminal further executes the following procedures: obtaining a target character string by encoding the metadata of the first file by using a preset coding scheme, and storing the target character string and the deletion time of the first file in correspondence in a binary file of the second directory.

This embodiment provides another manner of storing the metadata after the mobile terminal obtains a delete instruction, improving flexibility of the solution.

With reference to the tenth implementation of the first aspect of this application, in an eleventh implementation of the first aspect of this application, the mobile terminal may generate the second data table in the following manner: determining the deletion time of the first file based on the second name, determining the target character string corresponding to the deletion time in the binary file, obtaining the metadata of the first file by decoding the target character string by using the preset coding scheme, and generating the second data table based on the metadata obtained through decoding.

This embodiment provides another manner of generating the second data table, improving flexibility of the solution.

With reference to the first aspect of this application and the first to the sixth implementations of the first aspect, in a twelfth implementation of the first aspect of this application, before deleting the first data table, the mobile terminal may back up the first data table to obtain a third data table; and after deleting the first data table, the mobile terminal generates the second data table based on the third data table.

This embodiment provides another manner of generating the second data table, improving flexibility of the solution.

A second aspect of this application provides a mobile terminal. The mobile terminal includes: a touchscreen, where the touchscreen includes a touch-sensitive surface and a display screen; one or more processors; a memory; a plurality of application programs; and one or more computer programs, where the one or more computer programs are stored in the memory, the one or more computer programs include an instruction, and when the instruction is executed by the mobile terminal, the mobile terminal performs the following steps: obtaining a first operation entered by a user, and in response to the first operation, displaying a first file on a first screen of a first application, obtaining a second operation entered by the user on the first screen, in response to the second operation, skipping displaying the first file on the first screen of the first application, and displaying the first file on a recycle bin screen; deleting a first data table of the first application, where the first file is invisible to the user on the recycle bin screen of the first application due to deletion of the first data table, that is, the first file cannot be displayed on the recycle bin screen; and after the first data table is deleted, obtaining a third operation entered by the user, and in response to the third operation, generating a second data table, where the first file is visible to the user on the recycle bin screen of the first application due to deletion of the second data table, that is, the first file can be displayed on the recycle bin screen.

The first data table and the second data table are recycle bin data tables, and are used to record metadata of a file belonging to a recycle bin. The first application displays, based on the recycle bin data tables, the file belonging to the recycle bin. The first data table is originally stored on the mobile terminal, and the second data table is generated after the first data table is deleted. Types of metadata recorded in the two data tables may be the same or different.

With reference to the second aspect of this application, in a first implementation of the second aspect of this application, before the second operation entered by the user on the first screen is obtained, the first file belongs to a first album of the first application; and after the second operation entered by the user on the first screen is obtained, the first file belongs to a recycle bin album of the first application; and after generating the second data table, the mobile terminal further performs the following steps: displaying the first file on the recycle bin screen; obtaining a fourth operation, entered by the user on the recycle bin screen, for recovering the first file; in response to the fourth operation, changing an album to which the first file belongs from the recycle bin album to a target album; and displaying the first file on a screen corresponding to the target album.

The target album is a system- or user-specified album, and is used by the user to manage a multimedia file recovered on the recycle bin screen.

With reference to the second aspect of this application, in a second implementation of the second aspect of this application, before the second operation entered by the user on the first screen is obtained, the first file belongs to a first album of the first application; and after the second operation entered by the user on the first screen is obtained, the file belongs to a recycle bin album of the first application; and after generating the second data table, the mobile terminal further performs the following steps: displaying the first file on the recycle bin screen; and obtaining a fourth operation, entered on the recycle bin screen, for recovering the first file; in response to the fourth operation, changing an album to which the first file belongs from the recycle bin album to a first album; and displaying the first file on a screen corresponding to the first album.

With reference to the second aspect of this application, in a third implementation of the second aspect of this application, after generating the second data table, the mobile terminal further performs the following steps: displaying the first file on the recycle bin screen of the first application; and obtaining a fifth operation, entered on the recycle bin screen, for permanently deleting the first file; and in response to the fifth operation, permanently deleting the first file, that is, deleting the first file from the mobile terminal, where the first file is no long stored on the mobile terminal after being permanently deleted.

With reference to the second aspect of this application, in a fourth implementation of the second aspect of this application, after generating the second data table, the mobile terminal further executes the following procedures: displaying the first file on the recycle bin screen of the first application; and obtaining a sixth operation, entered by the user on the recycle bin screen, for viewing metadata of the first file, and in response to the sixth operation, displaying the metadata of the first file, where the metadata includes at least one of the following: an original filename of the first file, an original file identifier of the first file, a deletion time of the first file, a source storage path of the first file, a current storage path of the first file, a date taken time of the first file, a picture orientation of the first file, a cloud globally unique identifier of the first file, a hash value of the first file, and a cloud identifier of a source album to which the first file belongs.

The original filename is a filename of the first file before the processor obtains the second operation. The original file identifier is an identifier, in a corresponding data table, of the first file before the processor obtains the second operation. The source storage path is a storage path of the first file before the processor obtains the second operation. The current storage path is a storage path of the first file when the processor obtains the sixth operation. The source album is an album to which the first file belongs before the processor obtains the second operation.

With reference to any one of the second aspect of this application and the first to the fourth implementations of the second aspect, in a fifth implementation of the second aspect of this application, the mobile terminal may further perform the following step: skipping displaying, on the recycle bin screen of the first application, a file that is the same as the first file and that is stored on a cloud server.

With reference to any one of the second aspect of this application and the first to the fifth implementations of the second aspect, in a sixth implementation of the second aspect of this application, after generating the second data table, the mobile terminal may further perform the following steps: displaying a selection screen; and obtaining a seventh operation entered by the user on the selection screen, and in response to the seventh operation, displaying the first file selected by the user on the recycle bin screen of the first application, where for files not selected by the user, these files may be permanently deleted.

With reference to any one of the second aspect of this application and the first to the sixth implementations of the second aspect, in a seventh implementation of the second aspect of this application, in response to the second operation, the processor may further execute the following procedures: changing a storage location of the first file from a first directory to a second directory, and changing a filename of the first file from a first name to a second name, where the second directory is used to store a file displayed on the recycle bin screen of the first application. After changing the storage location of the first file from the first directory to the second directory, the mobile terminal can display the first file on the recycle bin screen.

With reference to the seventh implementation of the second aspect of this application, in an eighth implementation of the second aspect of this application, the second name is a target character string obtained by encoding the metadata of the first file by using a preset coding scheme.

With reference to the eighth implementation of the second aspect of this application, in a ninth implementation of the second aspect of this application, the mobile terminal may generate the second data table in the following manner: obtaining the metadata of the first file by decoding the second name by using the preset coding scheme, and generating the second data table based on the metadata obtained through decoding.

With reference to the seventh implementation of the second aspect of this application, in a tenth implementation of the second aspect of this application, the second name is the deletion time of the first file; and the mobile terminal further performs the following steps: obtaining a target character string by encoding the metadata of the first file by using a preset coding scheme, and storing the target character string and the deletion time of the first file in correspondence in a binary file of the second directory.

With reference to the tenth implementation of the second aspect of this application, in an eleventh implementation of the second aspect of this application, the processor may generate the second data table in the following manner: determining the deletion time of the first file based on the second name, determining the target character string corresponding to the deletion time in the binary file, obtaining the metadata of the first file by decoding the target character string by using the preset coding scheme, and generating the second data table based on the metadata obtained through decoding.

With reference to the second aspect of this application and the first to the sixth implementations of the second aspect, in a twelfth implementation of the second aspect of this application, the mobile terminal may back up the first data table before deleting the first data table, to obtain a third data table; and after deleting the first data table, the mobile terminal generates the second data table based on the third data table.

A third aspect of this application provides a mobile terminal, where the mobile terminal includes: a display module, configured to: in response to a first operation, display a first file on a first screen of a first application; an obtaining module, further configured to obtain a second operation entered by a user on the first screen, where the display module is further configured to: in response to the second operation, display the first file on a recycle bin screen of the first application; a deletion module, configured to delete a first data table, where the first file is invisible to the user on the recycle bin screen of the first application due to deletion of the first data table, where the obtaining module is further configured to obtain a third operation entered by the user; and a generation module, configured to: in response to the third operation, generate a second data table, where the first file is visible to the user on the recycle bin screen of the first application due to existence of the second data table.

With reference to the third aspect of this application, in a first implementation of the third aspect of this application, before the obtaining module obtains the second operation, the first file belongs to a first album of the first application; and after the obtaining module obtains the second operation, the file belongs to a recycle bin album of the first application; and after the generation module generates the second data table, the display module is further configured to display the first file on the recycle bin screen of the first application; the obtaining module is further configured to obtain a fourth operation entered by the user on the recycle bin screen; and the display module is configured to: in response to the fourth operation, display the first file on a screen corresponding to a first album of the first application, where after the obtaining module obtains the fourth operation, the first file belongs to the first album of the first application.

With reference to the third aspect of this application, in a second implementation of the third aspect of this application, before the obtaining module obtains the second operation, the first file belongs to a first album of the first application; and after the obtaining module obtains the second operation, the file belongs to a recycle bin album of the first application; and after the generation module generates the second data table, the display module is further configured to display the first file on the recycle bin screen of the first application; the obtaining module is further configured to obtain a fourth operation entered by the user on the recycle bin screen; and the display module is further configured to: in response to the fourth operation, display the first file on a screen corresponding to a target album of the first application, where after the obtaining module obtains the fourth operation, the first file belongs to the target album of the first application.

With reference to the third aspect of this application, in a third implementation of the third aspect of this application, after the generation module generates the second data table, the display module is further configured to display the first file on the recycle bin screen of the first application; the obtaining module is further configured to obtain a fifth operation entered by the user on the recycle bin screen; and the deletion module is further configured to: in response to the fifth operation, delete the first file from the mobile terminal.

With reference to the third aspect of this application, in a fourth implementation of the third aspect of this application, after the generation module generates the second data table, the obtaining module is further configured to obtain a sixth operation entered by the user, and in response to the sixth operation, display metadata of the first file; and the display module is further configured to: in response to the sixth operation, display the metadata of the first file, where the metadata includes at least one of the following: an original filename of the first file, an original file identifier of the first file, a deletion time of the first file, a source storage path of the first file, a current storage path of the first file, a date taken time of the first file, a picture orientation of the first file, a cloud globally unique identifier of the first file, a hash value of the first file, and a cloud identifier of a source album to which the first file belongs.

With reference to the third aspect of this application, in a fifth implementation of the third aspect of this application, the display module is further configured to: in response to the third operation, skip displaying a second file on the recycle bin screen of the first application, where the second file is a file that is the same as the first file and that is stored on a cloud server.

With reference to the third aspect of this application, in a sixth implementation of the third aspect of this application, after the generation module generates the second data table, the display module is further configured to display a selection screen; the obtaining module is further configured to obtain a seventh operation entered by the user on the selection screen; and the display module is further configured to: in response to the seventh operation, display the first file on the recycle bin screen of the first application.

With reference to any one of the third aspect of this application and the first to the sixth implementations of the third aspect of this application, in a seventh implementation of the third aspect of this application, the mobile terminal further includes: a processing module, configured to change a storage location of the first file from a first directory to a second directory, and change a filename of the first file from a first name to a second name, where the second directory is used to store a file displayed on the recycle bin screen of the first application.

With reference to the seventh implementation of the third aspect of this application, in an eighth implementation of the third aspect of this application, the second name is a target character string obtained by encoding the metadata of the first file by using a preset coding scheme.

With reference to the eighth implementation of the third aspect of this application, in a ninth implementation of the third aspect of this application, the generation module is specifically configured to: obtain the metadata of the first file by decoding the second name by using the preset coding scheme, and generate the second data table based on the metadata.

With reference to the seventh implementation of the third aspect of this application, in a tenth implementation of the third aspect of this application, the second name is the deletion time of the first file; and the mobile terminal further includes: a processing module, configured to: obtain a target character string by encoding the metadata of the first file by using a preset coding scheme, and store the target character string and the deletion time of the first file in correspondence in a binary file of the second directory.

With reference to the tenth implementation of the third aspect of this application, in an eleventh implementation of the third aspect of this application, the generation module is specifically configured to: determine the deletion time of the first file based on the second name; determine the target character string, in the second binary file, corresponding to the deletion time of the first file; obtain the metadata of the first file by decoding the target character string by using the preset coding scheme; and generate the second data table based on the metadata.

With reference to any one of the third aspect of this application and the first to the sixth implementation of the third aspect of this application, the mobile terminal further includes: a backup module, configured to back up the first data table to obtain a third data table, where the generation module is specifically configured to generate the second data table based on the third data table.

A fourth aspect of this application provides a computer readable storage medium, including an instruction. When the instruction runs on a computer, the computer executes the foregoing methods.

A fifth aspect of this application provides a computer program product including an instruction. When the computer program product runs on a computer, the computer executes the foregoing methods.

In the embodiments of this application, after the recycle bin data table is deleted, the mobile terminal can generate a new recycle bin data table, so that the mobile terminal can still display the first file on the recycle bin screen after application data is cleared, and the user can permanently delete or recover the first file on the recycle bin screen, thereby improving user experience.

DESCRIPTION OF EMBODIMENTS

Figure 1A:
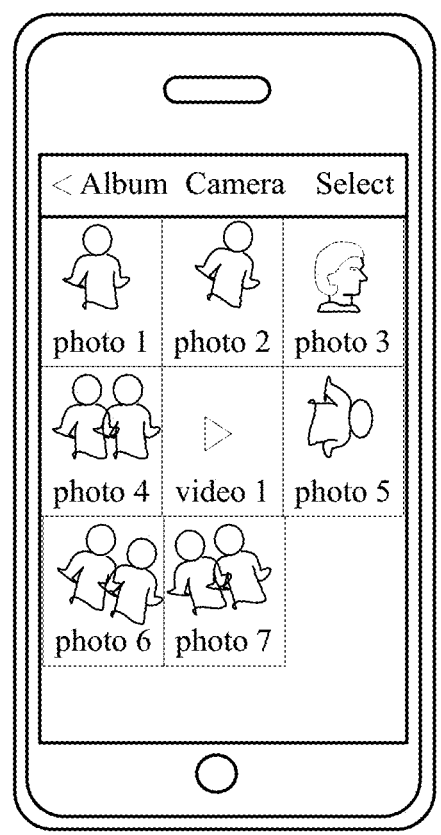
FIG. 1A is a schematic diagram of a management screen of a multimedia file.

The following describes the technical solutions in the embodiments of this application with reference to the accompanying drawings in the embodiments of this application. Apparently, the described embodiments are merely some but not all of the embodiments of this application.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device. To help understanding of the embodiments of this application, the following describes terms used in the embodiments of this application.

Metadata: Also referred to as intermediary data or relay data, metadata is data about data (data about data), mainly information describing properties (property) of data, and is used to support functions such as storage location indication, historical data, resource searching, and file recording. Metadata is an electronic directory. For the purpose of compiling a directory, content or characteristics of data need to be described and collected, so as to assist in data retrieval.

In the embodiments of the present invention, metadata of a picture or a video may include one of the following: a filename extension, a filename (display name), a deletion time (recycled time), a file identifier (local media identifier), a current storage path, a source storage path (source path), a date taken time (date taken), a picture orientation (orientation), a cloud identifier of a source album (album identifier), a hash value (hash) of a file, a cloud globally unique identifier (cloud globally unique identifier, Cloud GUID) of the file, and a photographing location.

The original filename is a filename of a first file before a mobile terminal obtains a second operation. The original identifier is an identifier, in a corresponding data table, of the first file before the mobile terminal obtains the second operation. The source storage path is a storage path of the first file before the mobile terminal obtains the second operation. The current storage path is a storage path of the first file when the mobile terminal obtains a sixth operation. The source album is an album to which the first file belongs before the mobile terminal obtains the second operation.

Album: A picture management application is used to manage pictures and videos in a mobile terminal. Some picture management applications classify pictures and videos in the mobile terminal into a plurality of groups for management, based on how the pictures and videos are obtained. An album to which a picture or a video belongs is a group to which the picture or the video belongs. For example, a picture and a video downloaded from a WeChat application are classified into one group, both belonging to a WeChat album; and a picture and a video taken by a camera application are classified into one group, both belonging to a camera album.

A recycle bin album is a special group. A picture or a video deleted by a user in a picture management application are moved from an original group to this group. In other words, an album to which the picture and the video belong is changed from a source album to the recycle bin album. It should be understood that in some embodiments, the recycle bin album is also referred to as a recent delete album, a delete album, or other names. This is not specifically limited in this application.

In addition, it should be noted that in the following embodiments of this application, there are descriptions like "a first file belongs to a first album of a first application". "Belongs to" herein may be so understood that, after a user starts the first application (for example, an album application) and taps an album, the first file is presented in the album. In the sense of user perception, it may be understood that the user sees the first file in the first album.

It should be understood that the picture management application may display pictures and videos in groups by album, or display pictures and videos by obtaining location or obtaining time.

Recycle bin: A recycle bin in the embodiments of this application refers to a group to which deleted multimedia files such as pictures and videos belong. It should be understood that recycle bins may be classified into a local recycle bin and a cloud recycle bin. The local recycle bin is used by a user to manage multimedia files locally deleted from a mobile terminal, and the cloud recycle bin is used by the user to manage multimedia files deleted from a cloud server. When the mobile terminal is connected to the cloud server, the user can upload a multimedia file from the local recycle bin to the cloud recycle bin, and may also download a multimedia file from the cloud recycle bin to the local recycle bin.

Application data: Application data in the embodiments of this application is data recorded in a running process of an application. For example, for a communications application, application data of the communications application may include user account information, a chat history, and the like; for a browser application, application data of the browser application may include a browse history, a search history, and the like; and for a media management application, application data of the media management application may include a record generated in a process of managing a multimedia file by a user, for example, a classification record of multimedia files by the user, a change history of a multimedia file by the user, and metadata information corresponding to each multimedia file.

Filename extension: Also referred to as an extension of a file, a filename extension is a mechanism used for an operating system to identify a file type. Generally, an extension follows a main filename, and is delimited from the main filename with a separator. For example, in a filename like "example.txt", example is a filename, and txt is an extension, which indicates that this file is a pure text file.

Data table: A data table in this application is a carrier, in a media management application, that is used to record metadata of a multimedia file managed by the media management application. The media management application presents the multimedia file based on the metadata recorded in the data table.

File identifier (local media identifier): A file identifier in the embodiments is an identifier of a multimedia file in a data table. In one data table, different multimedia files are corresponding to different identifiers. In some embodiments of this application, original file identifiers are used for naming, to ensure uniqueness of filenames. The original file identifier is an identifier in a data table before a second operation is entered by a user.

Directory: A directory in the embodiments of this application is a folder in which a multimedia file is stored on a mobile terminal. A first directory is a directory in which a multimedia file is stored before being deleted, and a second directory is a directory used to store a multimedia file corresponding to a local recycle bin. Key-value pair (key-value): a form of data storage. A key (key) represents a number of a stored value, and value (value) represents data that needs to be stored. A unique corresponding value can be obtained based on a key. In this application, a target character string is used as a value, a deletion time is used as a key, and a unique corresponding target character string can be found by using the deletion time.

Base64: Base64 is one of most common coding schemes used to transmit 8-bit byte codes on the Internet. Base64 is a method for representing binary data based on 64 printable characters. A coding rule of Base64 is as follows: (1) transforming three characters into four characters; (2) adding a linefeed at every 76 characters; and (3) displaying a terminator finally.

Multimedia database: a database used to store multimedia files (including audio, videos, and pictures) in a mobile phone. When the mobile phone is started, a media scanner service (Media Scanner Service) process is started to scan for multimedia files whose extension is jpg or mp4 in the mobile phone, and add information about these multimedia files to the multimedia database. An application program on the mobile phone fetches required multimedia information from the multimedia database.

To facilitate the ease of managing phone memory by a user, a large quantity of mobile phones are provided with a data deletion function, and a user can delete application data and/or cache data of some applications through system setting of the mobile phone, to release more storage space. After the user clears, through system setting, application data of a picture management application (for example, a gallery application or an album application), when the user restarts the picture management application, the picture management application obtains, from the multimedia database, metadata of pictures and videos that are stored on the mobile phone, and displays, in the picture management application based on the obtained metadata, the pictures and videos in the mobile phone.

However, for pictures and videos that are removed to a recycle bin album, to prevent displaying by a third-party application, when the pictures and videos are removed to the recycle bin album, the picture management application performs special processing on formats of the pictures and videos, for example, removing extensions such as jpg and mp4. After the user clears the application data of the picture management application, when the user restarts the picture management application, although the pictures and videos in the recycle bin album are still stored in a system, because the media scanner service process is unable to find a file whose extension is not jpg or mp4, the picture management application cannot obtain, from the media database, metadata of the pictures and videos in the recycle bin album, and cannot reconstruct a data table corresponding to the recycle bin album in the picture management application. Therefore, the picture management application is unable to display the pictures and videos in the recycle bin album, and is also unable to permanently delete or recover the pictures and videos in the recycle bin album. As a result, user experience is compromised and system storage space is occupied.

The embodiments of this application disclose a file processing method and a mobile terminal, to display a multimedia file on a recycle bin screen after application data is cleared, so that a user can permanently delete or recover the multimedia file on the recycle bin screen, thereby improving user experience.

For ease of understanding of the embodiments of this application, the following briefly describes a scenario that the file processing method and the mobile terminal in this application are applicable to.

The mobile terminal in the embodiments of this application includes but is not limited to electronic devices such as a mobile phone, a tablet computer, an e-reader, a handheld game console, or an in-vehicle electronic device. An operating system may be, for example, an Android, Windows Phone, BlackBerry, or iOS system. This is not specifically limited in the embodiments of this application. It should be noted that the terminal in the embodiments of this application is provided with a recycle bin function.

A multimedia file in the embodiments of this application includes but is not limited to files such as a photo, video, or audio file.

A multimedia management application in the embodiments of this application may be specifically a picture management application (such as a gallery application or an album application), or an audio file management application (a recorder application or the like), or another application used to manage multimedia files. This is not specifically limited in the embodiments of this application.

In some solutions, the mobile terminal stores some multimedia files, and the multimedia management application is an application used to manage these multimedia files, and records metadata corresponding to these multimedia files by using a data table. Specifically, the multimedia management application supports a recycle bin function, and a data table corresponding to the multimedia management application includes a non-recycle-bin data table and a recycle bin data table. The non-recycle-bin data table is used to record metadata (for example, a filename, a storage path, a date taken time, and a picture orientation) of a multimedia file corresponding to a non-recycle-bin, and the recycle bin data table is used to record metadata (for example, a source storage path, a deletion time, a date taken time, and a picture orientation) of a multimedia file in a recycle bin. Table 1 is an example of the non-recycle-bin data table, and the table records metadata of eight multimedia files corresponding to a camera album.

TABLE 1

| File identifier | File-name | Storage path | Date taken | Picture orientation | Location |
|---|---|---|---|---|---|
| 0001 | Photo 1.jpg | Phone storage\DCIM\Camera\ photo 1.jpg | 20170102 12:03 | 90° | Shenzhen |
| 0002 | Photo 2.jpg | Phone storage\DCIM\Camera\ photo 2.jpg | 20170102 12:04 | 90° | Shenzhen |
| 0003 | Photo 3.jpg | Phone storage\DCIM\Camera\ photo 3.jpg | 20170102 12:20 | 90° | Shenzhen |
| 0004 | Photo 4.jpg | Phone storage\DCIM\Camera\ photo 4.jpg | 20170102 12:30 | 90° | Shenzhen |
| 0005 | Video 1.mp4 | Phone storage\DCIM\Camera\ video 1.mp4 | 20170103 11:04 | 90° | Guangzhou |
| 0006 | Photo 5.jpg | Phone storage\DCIM\Camera\ photo 5.jpg | 20170105 09:11 | 180° | Shenzhen |
| 0007 | Photo 6.mp4 | Phone storage\DCIM\Camera\ photo 6.jpg | 20170107 10:34 | 90° | Shenzhen |
| 0008 | Photo 7.jpg | Phone storage\DCIM\Camera\ photo 7.jpg | 20170107 10:35 | 90° | Shenzhen |

Figure 1B:
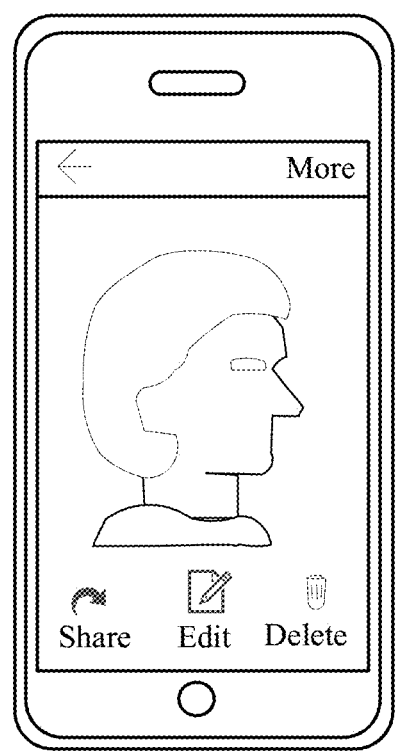
FIG. 1B is another schematic diagram of a management screen of a multimedia file.
Figure 1C:
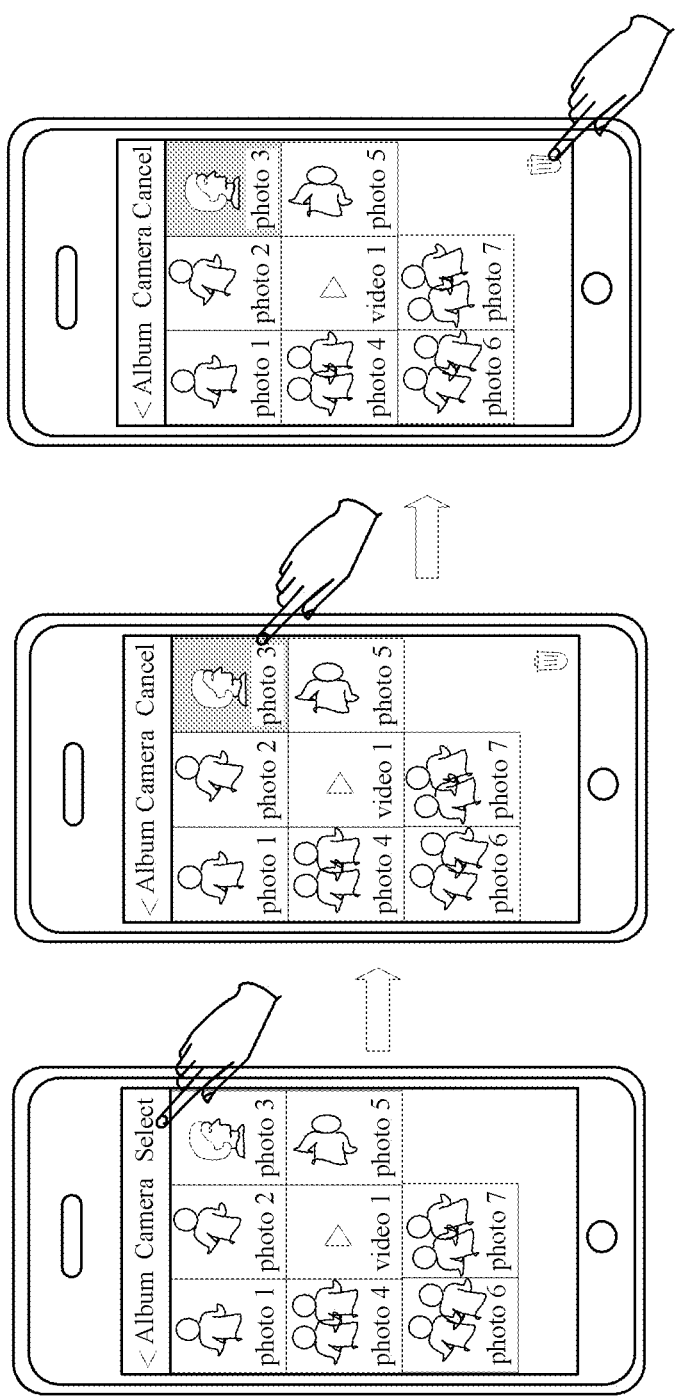
FIG. 1C is a schematic diagram in which a user enters a delete instruction on a management screen of a multimedia file.
Figure 1D:
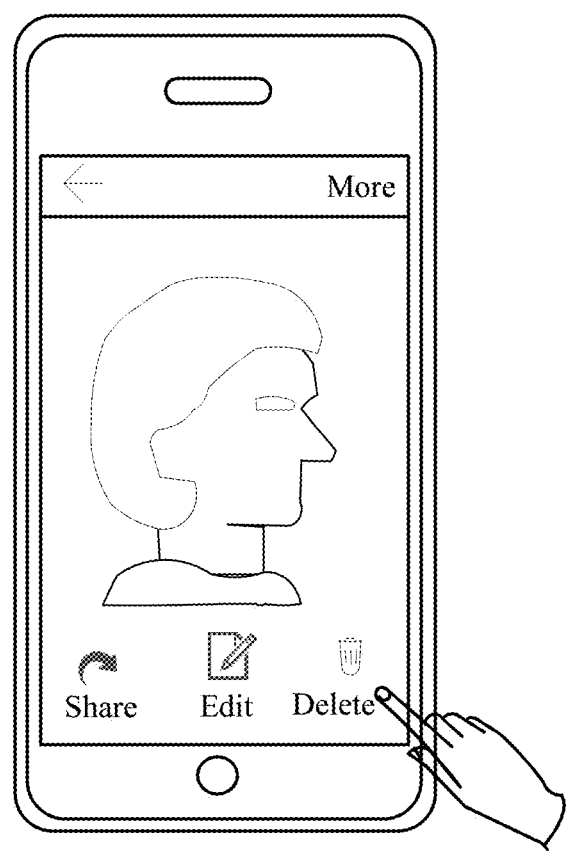
FIG. 1D is another schematic diagram in which a user enters a delete instruction on a management screen of a multimedia file.
Figure 1E:
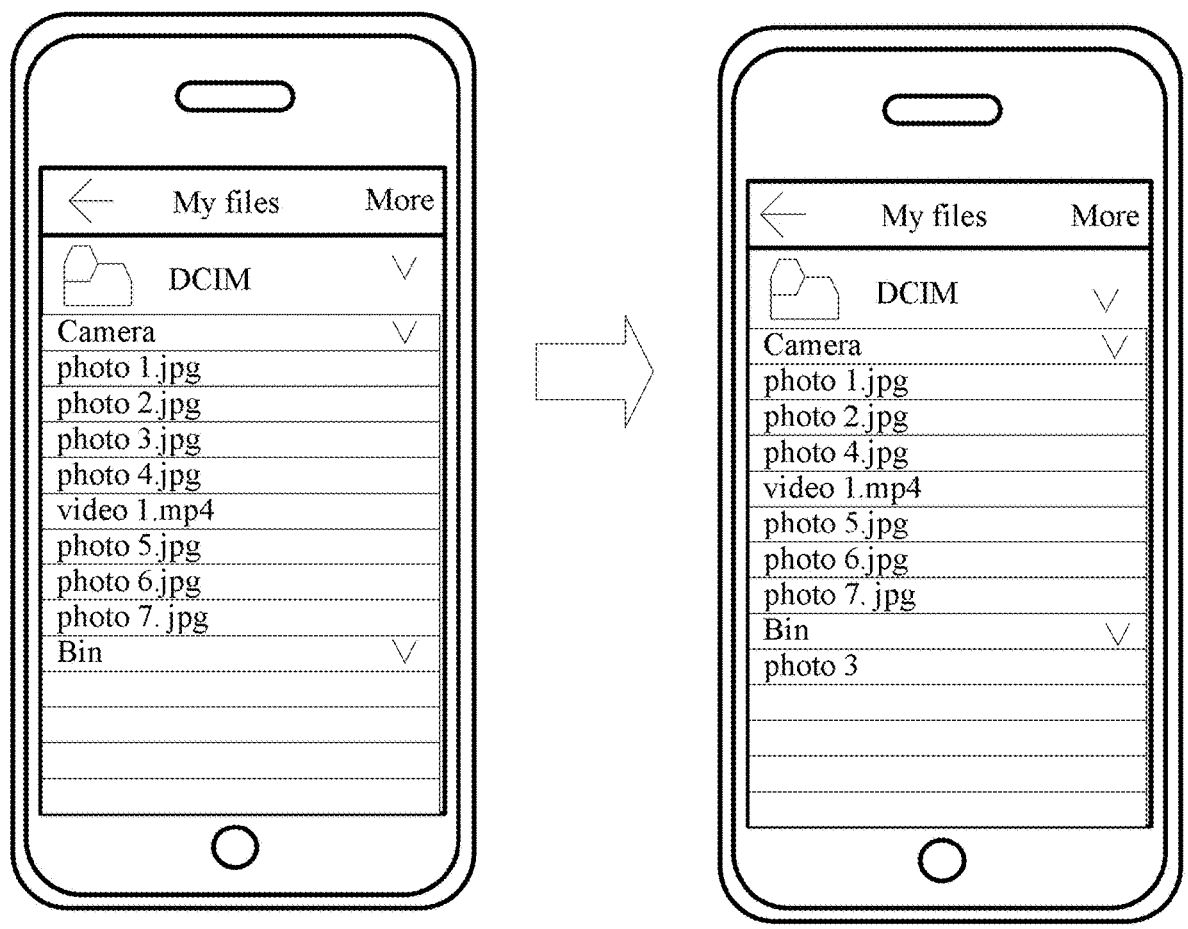
FIG. 1E is a schematic diagram in which a mobile terminal moves a first file from a source directory to a recycle bin directory.

The mobile terminal receives an instruction for opening a multimedia management application, and presents a multimedia file management screen, as shown in FIG. 1A or FIG. 1B. A user enters a delete instruction on the multimedia file management screen, as shown in FIG. 1C or FIG. 1D. The user selects, on the multimedia file management screen, a multimedia file that needs to be deleted, and then taps a delete icon to delete the selected multimedia file. After receiving the delete instruction, the mobile terminal removes an extension of the deleted multimedia file, moves the deleted multimedia file from a source directory to a recycle bin directory (as shown in FIG. 1E), and removes metadata corresponding to the deleted multimedia file from a non-recycle-bin data table. A metadata-removed non-recycle-bin data table is described in Table 2. In addition, the metadata corresponding to the multimedia file (that is, the deleted multimedia file) that is moved to the recycle bin directory is added to a recycle bin data table. A metadata-added recycle bin data table is described in Table 3.

TABLE 2

| File identifier | File-name | Storage path | Date taken | Picture orientation | Location |
|---|---|---|---|---|---|
| 0001 | Photo 1.jpg | Phone storage\DCIM\Camera\ photo 1.jpg | 20170102 12:03 | 90° | Shenzhen |
| 0002 | Photo 2.jpg | Phone storage\DCIM\Camera\ photo 2.jpg | 20170102 12:04 | 90° | Shenzhen |
| 0004 | Photo 4.jpg | Phone storage\DCIM\Camera\ photo 4.jpg | 20170102 12:30 | 90° | Shenzhen |

TABLE 2-continued

| File identifier | File-name | Storage path | Date taken | Picture orientation | Location |
|---|---|---|---|---|---|
| 0005 | Video 1.mp4 | Phone storage\DCIM\Camera\ video 1.mp4 | 20170103 11:04 | 90° | Guangzhou |
| 0006 | Photo 5.jpg | Phone storage\DCIM\Camera\ photo 5.jpg | 20170105 09:11 | 0° | Shenzhen |
| 0007 | Photo 6.mp4 | Phone storage\DCIM\Camera\ photo 6.jpg | 20170107 10:34 | 90° | Shenzhen |
| 0008 | Photo 7.jpg | Phone storage\DCIM\Camera\ photo 7.jpg | 20170107 10:35 | 90° | Shenzhen |

TABLE 3

| File identifier | Recycle bin file path | Source storage path | Recycled time | Date taken | Picture orientation | Location |
|---|---|---|---|---|---|---|
| 0001 | Phone storage\ DCIM\ Bin | Phone storage\ DCIM\ Camera\ photo 3.jpg | 20170116 11:11:03:01 | 20170102 12:20 | 90° | Shenzhen |

Figure 1F:
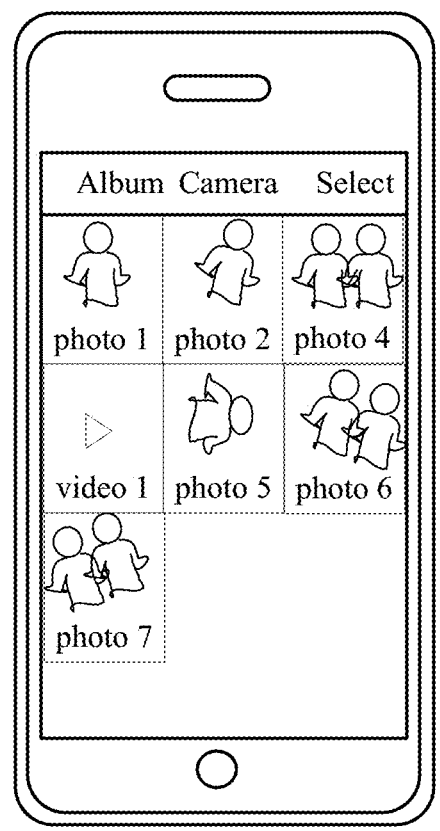
FIG. 1F is a schematic diagram of a multimedia file management screen after a first file is deleted.
Figure 1G:
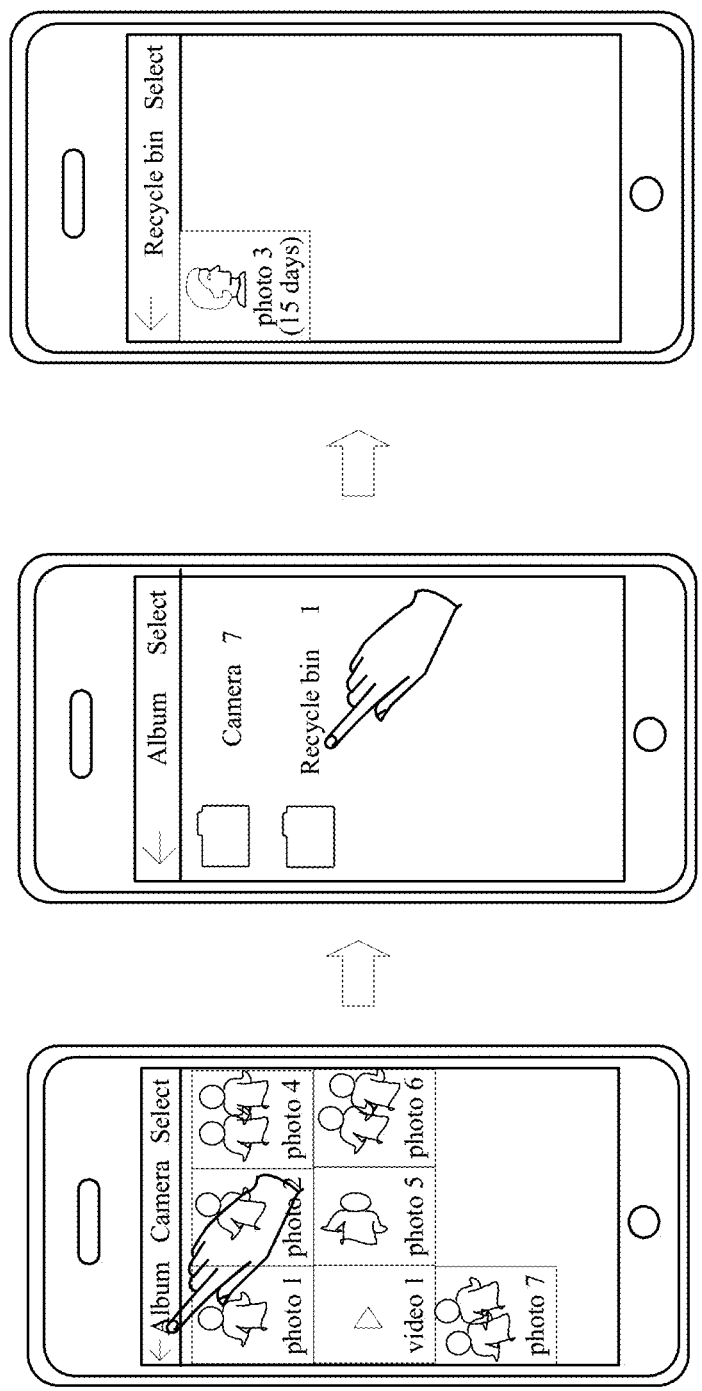
FIG. 1G is a schematic diagram of a recycle bin screen after a first file is deleted.

After the user enters the delete instruction on the multimedia file management screen, the deleted multimedia file is not included on the multimedia file management screen presented by the mobile terminal, as shown in FIG. 1F. When the mobile terminal receives an instruction for opening a recycle bin, the mobile terminal presents the deleted multimedia file on a screen corresponding to the recycle bin, as shown in FIG. 1G. The user may recover or permanently delete the multimedia file on this operation screen.

Figure 1H:
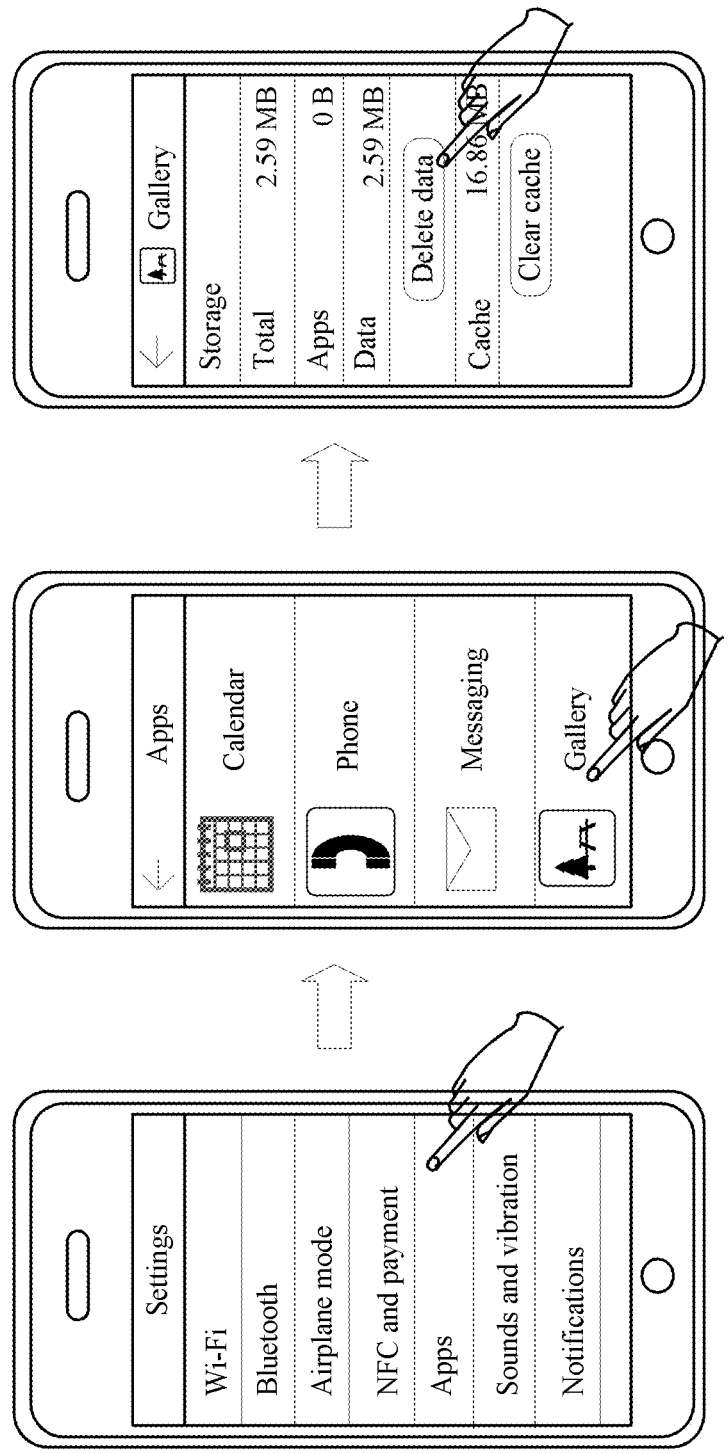
FIG. 1H is a schematic diagram in which a user enters, on a mobile terminal, an instruction for deleting data of a first application.

The mobile terminal receives a clear application data instruction for a media management application, as shown in FIG. 1H. The mobile terminal clears application data of the media management application. The cleared application data includes at least a non-recycle-bin data table and a recycle bin data table of the media management application.

Figure 1I:
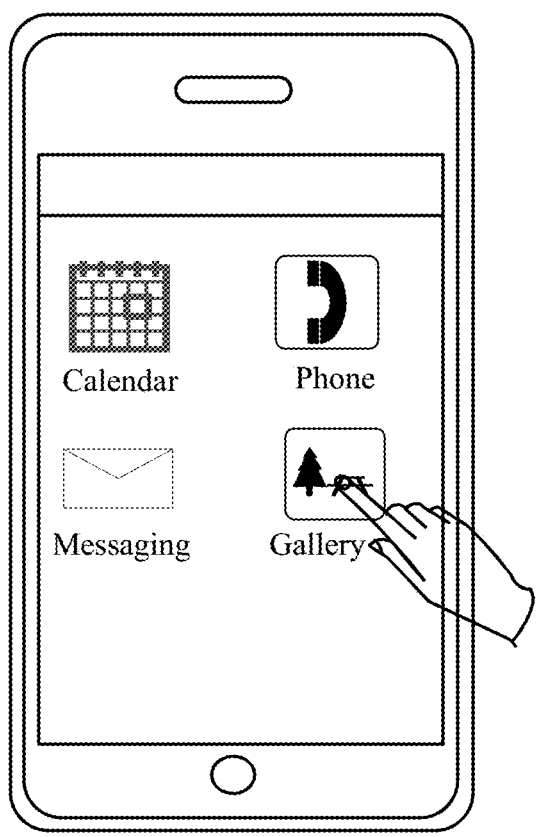
FIG. 1I is a schematic diagram of an instruction entered by a user for starting a multimedia management application.

After the mobile terminal clears the application data of the media management application, the mobile terminal receives an instruction for starting the media management application. The instruction may be specifically triggered by the user by tapping an application icon of the first application, as shown in FIG. 1I, or may be triggered by the user by tapping an interface to the first application in another application, or may be automatically triggered by the mobile terminal in a specific condition. This is not specifically limited herein.

Figure 1J:
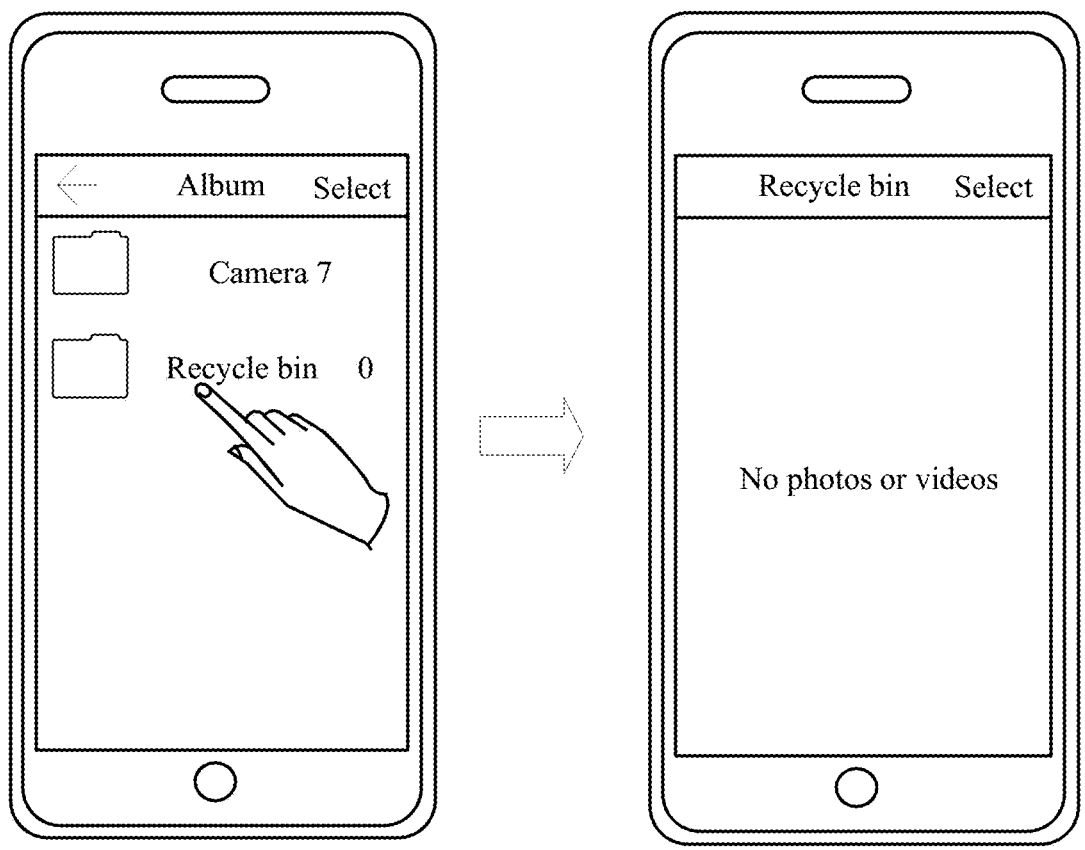
FIG. 1J is a schematic diagram of an operation screen corresponding to a recycle bin after application data is deleted.

After the mobile terminal starts the media management application, in some solutions, the mobile terminal fetches metadata of a multimedia file in the mobile terminal from a media database, and creates a data table of the multimedia management application based on the metadata. Because a multimedia file in a directory (for example, a BIN directory in FIG. 1E) corresponding to the recycle bin does not include a filename extension, a media scanner service process cannot find the multimedia file in the directory corresponding to the recycle bin. The media database does not include the multimedia file in the directory corresponding to the recycle bin, and therefore the created data table of the multimedia management application does not include the metadata of the multimedia file in the recycle bin data table. In this solution, after the application data of the media management application is cleared, when the media management application is restarted, and when an instruction for opening the recycle bin is received, no multimedia files are displayed on the recycle bin screen presented by the mobile terminal, as shown in FIG. 1J.

In this embodiment of this application, after the mobile terminal receives a delete instruction for a multimedia file, in a process of moving the deleted multimedia file from a source directory to the recycle bin directory, the mobile terminal extracts and stores metadata of the deleted multimedia file, and renames the deleted multimedia file. After the application data of the media management application is cleared, the mobile terminal can reconstruct a non-recycle-bin data table and a recycle bin data table, and then display multimedia files in a recycle bin album and a non-recycle-bin album in the media management application based on the non-recycle-bin data table and the recycle bin data table.

Figure 2:
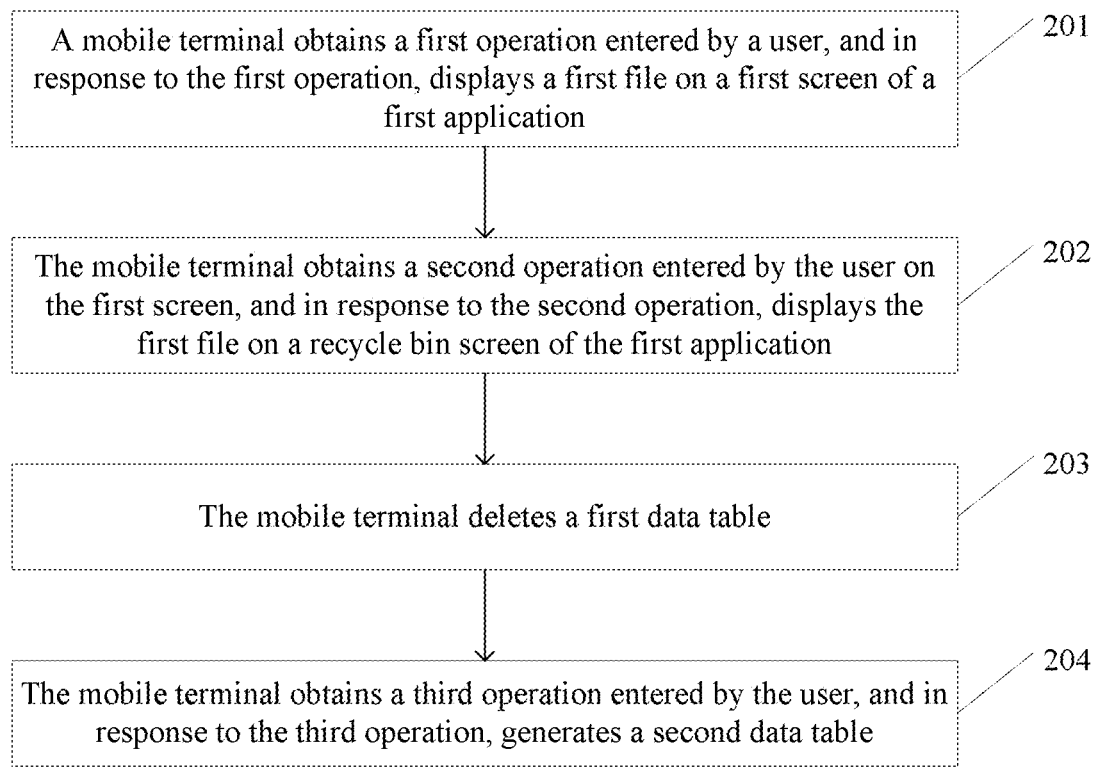
FIG. 2 is a flowchart of an embodiment of a file processing method according to an embodiment of this application.

Based on the foregoing example scenario, the following describes in detail a process of renaming a multimedia file and reconstructing a recycle bin data table by a mobile terminal in an embodiment of this application. Referring to FIG. 2, an embodiment of a file processing method in this embodiment of this application includes the following steps.

201. A mobile terminal obtains a first operation entered by a user, and in response to the first operation, displays a first file on a first screen of a first application; and a user taps an icon of the first application, and in response to the operation, the mobile terminal starts the first application, and displays the first file on the first screen of the first application. The first application is a multimedia management application, and the first screen is a management screen of a multimedia file. The management screen can provide functional buttons for operations such as edit, delete, and classify for a multimedia file. The first screen may be a management screen for a plurality of multimedia files (including the first file), as shown in FIG. 1A, or a management screen for the first file, as shown in FIG. 1B. This is not specifically limited herein.

202. The mobile terminal obtains a second operation entered by the user on the first screen, and in response to the second operation, displays the first file on a recycle bin screen of the first application.

Specifically, the second operation may be a single delete instruction for a first file, as shown in FIG. 1C or FIG. 1D, or a batch delete instruction for a plurality of first files. For example, in a scenario shown in FIG. 1C, the user may select a plurality of multimedia files, and taps a delete icon to initiate a delete instruction for the plurality of multimedia files. This is not specifically limited herein.

After receiving the delete instruction, the mobile terminal moves the first file from a first directory to a second directory, that is, changes a storage location of the first file from the first directory to the second directory. The first directory is a directory in which the first file is stored before the user enters the delete instruction. The second directory is a directory used to store a file displayed on the recycle bin screen. In a process of moving the first file from the first directory to the second directory, the mobile terminal renames the first file, that is, changes a filename of the first file from a first name to a second name, and also extracts and stores metadata of the first file.

It should be noted that, after the mobile terminal moves the first file to the second directory, the mobile terminal can display the first file on the recycle bin screen of the first application. As shown in FIG. 1G the user selects a recycle bin album from an album selection screen of the first application, and the mobile terminal displays the recycle bin screen according to the instruction, where the screen includes a thumbnail corresponding to the first file. It should be understood that the instruction for opening the recycle bin screen is not limited to a form shown in FIG. 1G and a display form of the first file on the recycle bin screen is also not limited to a form shown in FIG. 1G.

Specifically, in this application of this embodiment, the metadata extracted by the mobile terminal needs to include at least a filename extension of an original filename of the first file. Specifically, according to a degree of recovery, the metadata extracted by the mobile terminal may further include one or more of the following: a main filename of the original filename (the first name), an original file identifier, a deletion time, a recycle bin file path, a source storage path of the first file, a date taken time, a picture orientation, a cloud identifier of a source album to which the first file belongs, a hash value of the first file, and a cloud globally unique identifier of the first file. The extracted metadata may be stored in the second name of the first file, may be stored in a binary file newly created in the second directory, or may be stored in other storage space. This is not specifically limited in this embodiment.

It should be understood that the original file identifier is a file identifier of the first file in a non-recycle-bin data table before the first file is deleted. The recycle bin file path is a storage path corresponding to a multimedia file displayed on the recycle bin screen. The source storage path is a location in which the first file is stored before the first file is deleted. The cloud identifier of the source album to which the first file belongs is an album identifier, in a cloud server, of the album to which the first file belongs before the first file is deleted. The cloud globally unique identifier of the first file is an identifier of the first file in the cloud server.

The following describes several storage manners thereof.

Manner 1. In the process of moving the first file from the first directory to the second directory, the mobile terminal generates a random number, splices the extracted metadata and the random number to obtain a character string, and uses the character string as a filename (the second name) of the first file in the second directory, that is, stores the metadata and the random number in combination. The extracted metadata of the mobile terminal is a filename extension of the first name. For example, a random number generated by the mobile terminal is "4531265", and a filename (the first name) of the first file in the first directory is "photo 3.jpg". The mobile terminal extracts a filename extension "jpg" of the first file, and splices the filename extension and the random number to obtain a character string "jpg4531265". The mobile terminal renames the first file as "jpg4531265".

Manner 2. In the process of moving the first file from the first directory to the second directory, the mobile terminal encodes the extracted metadata by using a preconfigured coding scheme to obtain a target character string, sets the target character string as a filename (the second name) of the first file in the second directory, that is, stores the single piece of metadata in the second name through encoding. The metadata extracted by the mobile terminal is the filename of the first file in the first directory, that is, the original filename. A scenario corresponding to FIG. 1C or FIG. 1D is used as an example for description. The original filename (the first name) of the first file is "photo 3.jpg", a target character string "55u454mHMy5qcGc=" is obtained by using Base64 coding, and the mobile terminal renames the first file as "55u454mHMy5qcGc=".

Manner 3. In a process of moving the first file from the first directory to the second directory, a character string obtained by splicing a plurality of pieces of extracted metadata is used as a filename (the second name) of the first file in the second directory, that is, the plurality of pieces of spliced metadata is stored in the second name.

Optionally, in some embodiments, the plurality of pieces of metadata extracted by the mobile terminal in manner 3 are the original filename of the first file and the original file identifier of the first file.

Optionally, in some embodiments, the plurality of pieces of metadata extracted by the mobile terminal in manner 3 are the original filename of the first file and the deletion time of the first file.

Optionally, in some embodiments, the plurality of pieces of metadata extracted by the mobile terminal in manner 3 are the original filename of the first file, the original file identifier of the first file, and the deletion time of the first file.

Figure 3A:
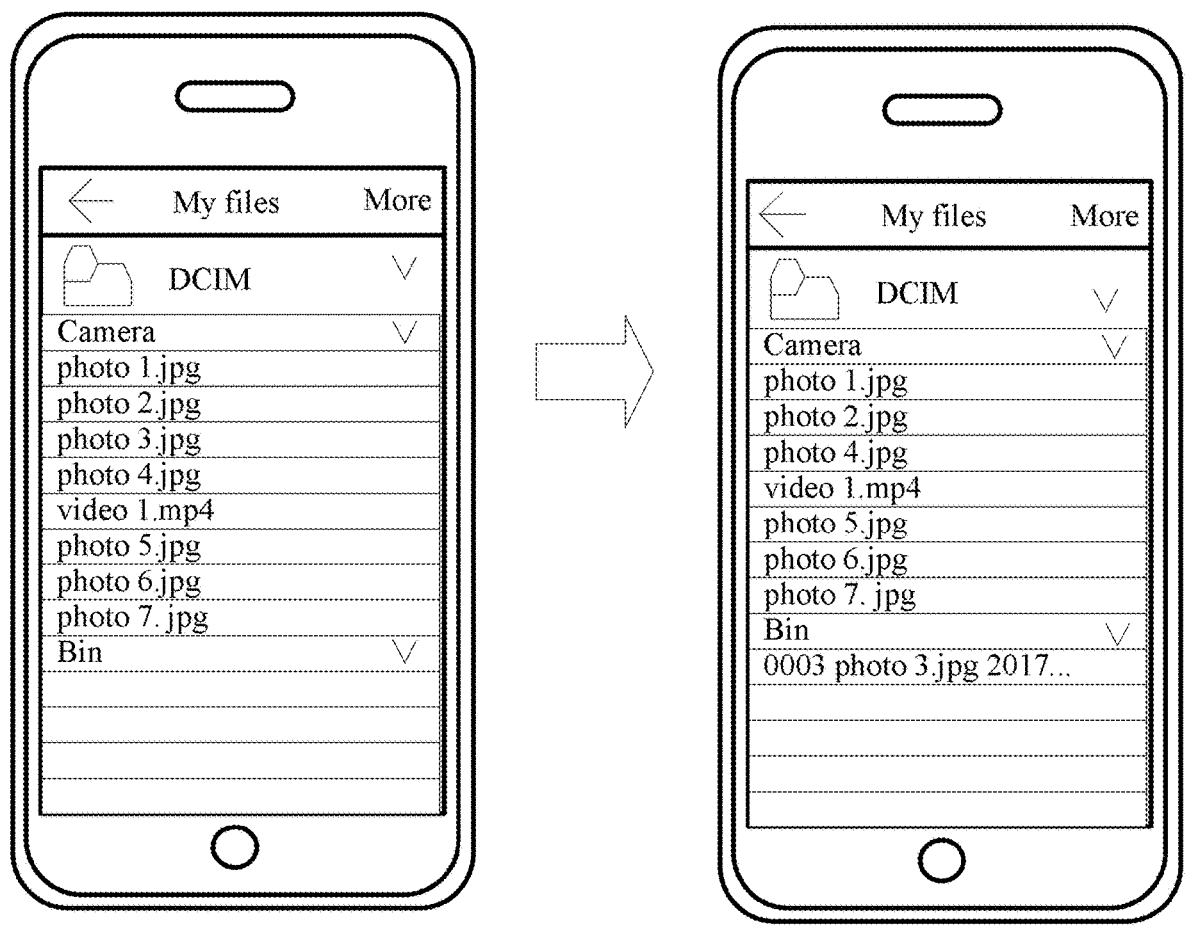
FIG. 3A is a schematic diagram in which a mobile terminal moves a first file from a first directory to a second directory according to an embodiment of this application.

The following uses a scenario corresponding to FIG. 1C or FIG. 1D as an example for description. The original filename (the first name) of the first file is "photo 3.jpg", the original file identifier is "0003", and the deletion time is "20170116". A character string obtained by splicing the three pieces of metadata by the mobile terminal is "0003 photo 3.jpg 20170116". The mobile terminal renames the first file as "0003 photo 3.jpg 20170116", as shown in FIG. 3A.

Manner 4. In a process of moving the first file from the first directory to the second directory, the mobile terminal may first splice a plurality of extracted metadata to obtain a character string, encodes the character string by using a preconfigured coding scheme to obtain a target character string, and uses the target character string as a filename (the second name) of the first file in the second directory, that is, stores the plurality of spliced metadata in the second name through encoding. The preconfigured coding scheme may include Base64 or other schemes, and this is not specifically limited herein.

Optionally, in this embodiment, before using the preconfigured coding scheme to encode the character string obtained through splicing, the mobile terminal may first compress the character string, and then encodes the compressed character string to obtain the target character string.

Optionally, in some embodiments, the plurality of pieces of metadata extracted by the mobile terminal in manner 4 are the original filename of the first file and the original file identifier of the first file.

Optionally, in some embodiments, the plurality of pieces of metadata extracted by the mobile terminal in manner 4 are the original filename of the first file and the deletion time of the first file.

Optionally, in some embodiments, the plurality of pieces of metadata extracted by the mobile terminal in manner 4 are the original filename of the first file, the original file identifier of the first file, and the deletion time of the first file.

Figure 3B:
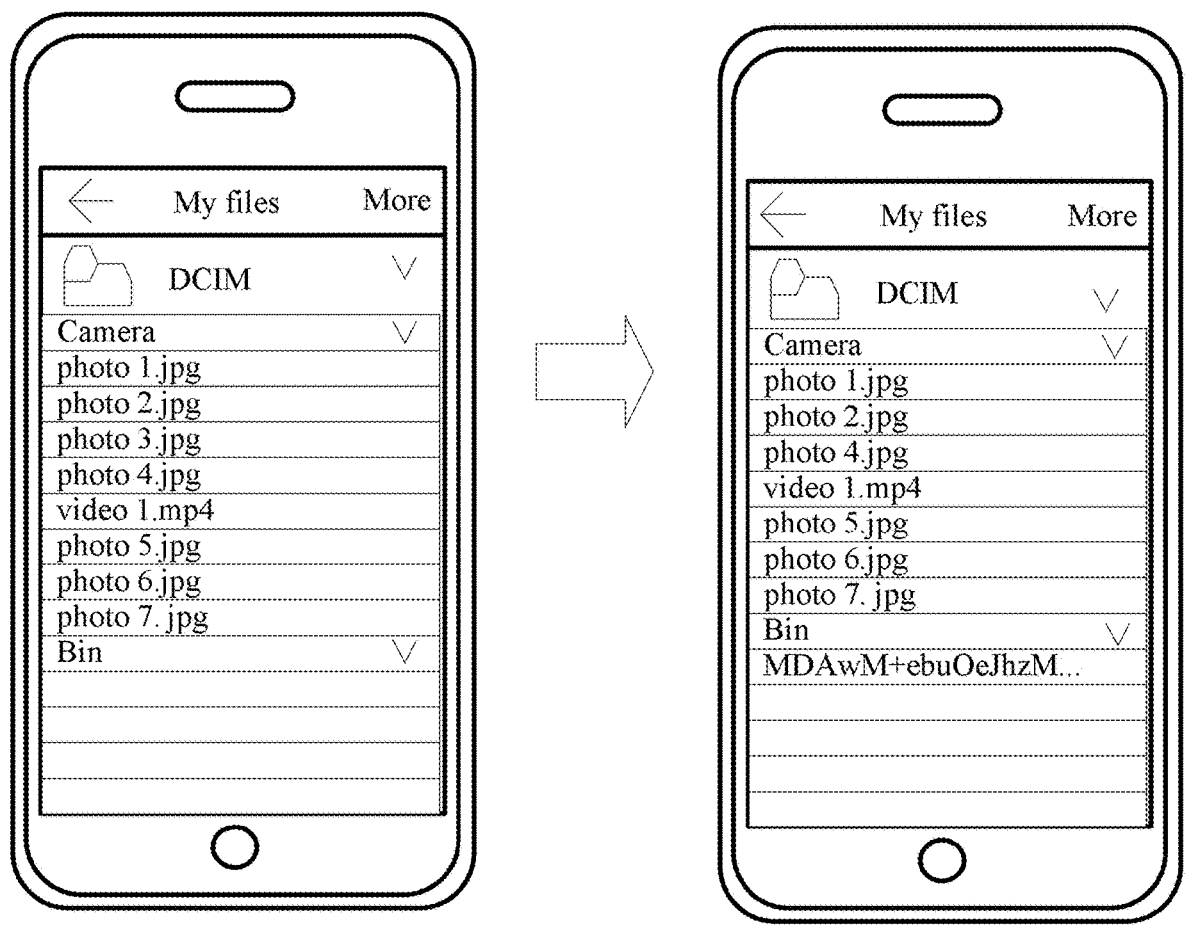
FIG. 3B is another schematic diagram in which a mobile terminal moves a first file from a first directory to a second directory according to an embodiment of this application.

In the example corresponding to manner 3, after the mobile terminal obtains the character string "0003 photo 3.jpg 20170116" by splicing the three pieces of metadata, the mobile terminal obtains a target character string "MDAwM+ebuOeJhzMuanBnMjAxN+W5tDHmnIgxNuaXpQ==" by using Base64 coding, and the mobile terminal renames the first file as "MDAwM+ebuOeJhzMuanBnMjAxN+W5tDHmnIgxNuaXpQ==", as shown in FIG. 3B.

It should be noted that the mobile terminal restricts a length of a filename. In manner 4, if the extracted metadata includes the original filename (the first name) of the first file, and the filename is user-editable, when the original filename has a relatively long character length, a character string length of a character string obtained through splicing or a target character string obtained through encoding may exceed a length limit of the mobile terminal. In this case, in a process of obtaining a character string through splicing, the mobile terminal may remove an end part of a main filename in the original filename, so that the character string length of the character string obtained through splicing or the target character string obtained through encoding does not exceed the length limit. For example, in Android (Android), it can be learnt from a Base64 coding rule that a character length ratio of a Base64-encoded character string to an original character string is 4:3. However, an Android-based mobile phone can support a maximum of 256 bytes in a character string length of a filename. To ensure that the Base64-encoded character string does not exceed this length (256 bytes), before being encoded, a character string should not exceed 192 bytes. In other words, the character string obtained through splicing should not exceed 192 bytes. The original filename (the first name) of the first file is "I am taking photos with Mom in front of our house wozaitianmnenhemamayiqipaizhaowozaitiananmenhemamayiqipaizhaowozaitianammenhema mayiqipaizhaowozaitianmnenhemamayiqipaizhaowozaitianmnenhemamayiqipaizhaoasaaaanjk hkjhkjh.jpg", the original file identifier of the first file is "0003", and the deletion time of the first file is "20170116 11:11:03". A length of a character string obtained by splicing the three pieces of data exceeds 192 bytes, and the mobile terminal removes an end part of a main name of the original filename to obtain "I am taking photos with Mom in front of our house", and then splices the truncated filename, the original file identifier, and the deletion time to obtain a character string "0003 I am taking photos with Mom at Tiananmen.jpg 20170116 11:11:03", where a length of this character string is less than 192 bytes. Then the character string is encoded by using the Base64 coding scheme to obtain a target character string with a length less than 256 bytes.

Manner 5. In the process of moving the first file from the first directory to the second directory, the mobile terminal may first splice a plurality of extracted metadata to obtain a character string, and then encodes the character string by using a preconfigured coding scheme to obtain a target character string. If a character length of the target character string does not exceed a system length limit, the mobile terminal determines the target character string as the filename (the second name) of the first file in the second directory. If a character length of the target character string exceeds a system length limit, in a key-value (key-value) manner, the mobile terminal uses the target character string as a value (value), uses a deletion time in the metadata as a key (key), stores the value and the key in a binary file newly created in the second directory, and determines the deletion time as the filename (the second name) of the first file in the second directory.

Optionally, in this embodiment, before encoding the character string obtained through encoding by using the preconfigured coding scheme, the mobile terminal may first compress the character string, and then encodes the compressed character string to obtain the target character string.

Optionally, in this embodiment, values (that is, target character strings) and keys (that is, deletion times) that are corresponding to a plurality of files may all be stored in a same binary file. A filename of the binary file may be defined in any way, and this is not limited in this embodiment. A file type (that is, a filename extension) of the binary file may be xml, txt, bin, or other extensions, and this is not specifically limited in this embodiment either.

Optionally, in some embodiments, the plurality of pieces of metadata extracted by the mobile terminal in manner 5 are the deletion time, the recycle bin file path, the source storage path, the date taken time, and the picture orientation.

Optionally, in some embodiments, the plurality of pieces of metadata extracted by the mobile terminal in manner 5 are the deletion time, the recycle bin file path, the source storage path, the date taken time, the picture orientation, and the cloud globally unique identifier.

Optionally, in some embodiments, the plurality of pieces of metadata extracted by the mobile terminal in manner 5 are the deletion time, the recycle bin file path, the source storage path, the date taken time, the picture orientation, the cloud identifier of the source album, and the hash value.

Optionally, in some embodiments, the plurality of pieces of metadata extracted by the mobile terminal in manner 5 are the deletion time, the recycle bin file path, the source storage path, the date taken time, the picture orientation, the cloud identifier of a source album, the hash value, and the cloud globally unique identifier.

Figure 3C:
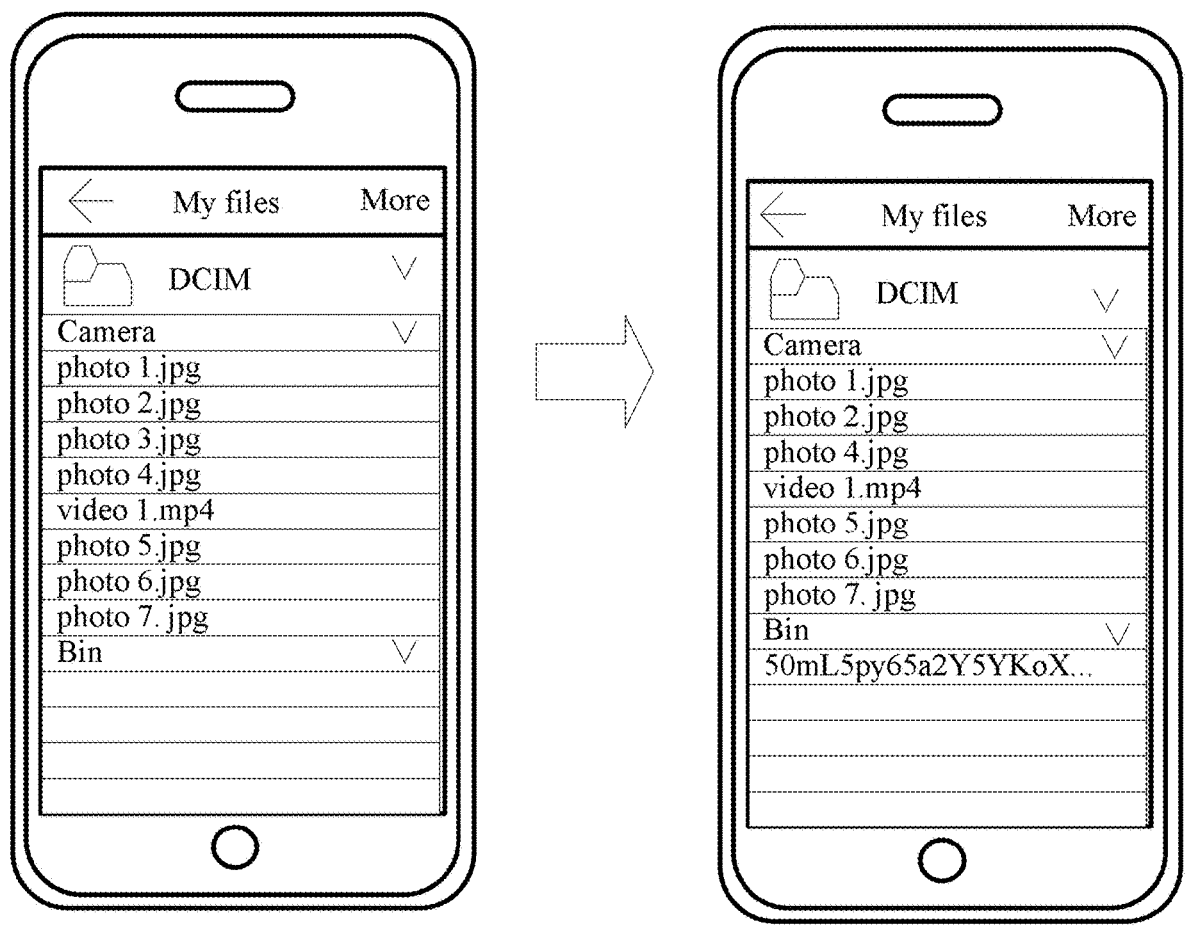
FIG. 3C is another schematic diagram in which a mobile terminal moves a first file from a first directory to a second directory according to an embodiment of this application.

The following uses a scenario corresponding to FIG. 1C or FIG. 1D as an example for description. Of a deleted multimedia file (the first file), a deletion time is "20170116 11:11:03:01", a recycle bin file path is "Phone storage\DCIM\Bin", a source storage path is "Phone storage\DCIM\Camera\photo 3.jpg", a date taken time is "20170102 12:20", and a picture orientation is "90°". A character string "Phone storage\DCIM\Bin Phone storage\DCIM\Camera\photo 3.jpg 20170116 11:11:03:01 20170102 12:20 90°" is obtained by splicing the foregoing metadata, and then the character string is encoded by using Base64 to obtain a target character string "50mL5py65a2Y5YKoX . . . (the following characters are omitted). A character length of the target character string is less than 255 bytes, and therefore the mobile terminal determines the target character string as the second name, as shown in FIG. 3C.

Figure 3D:
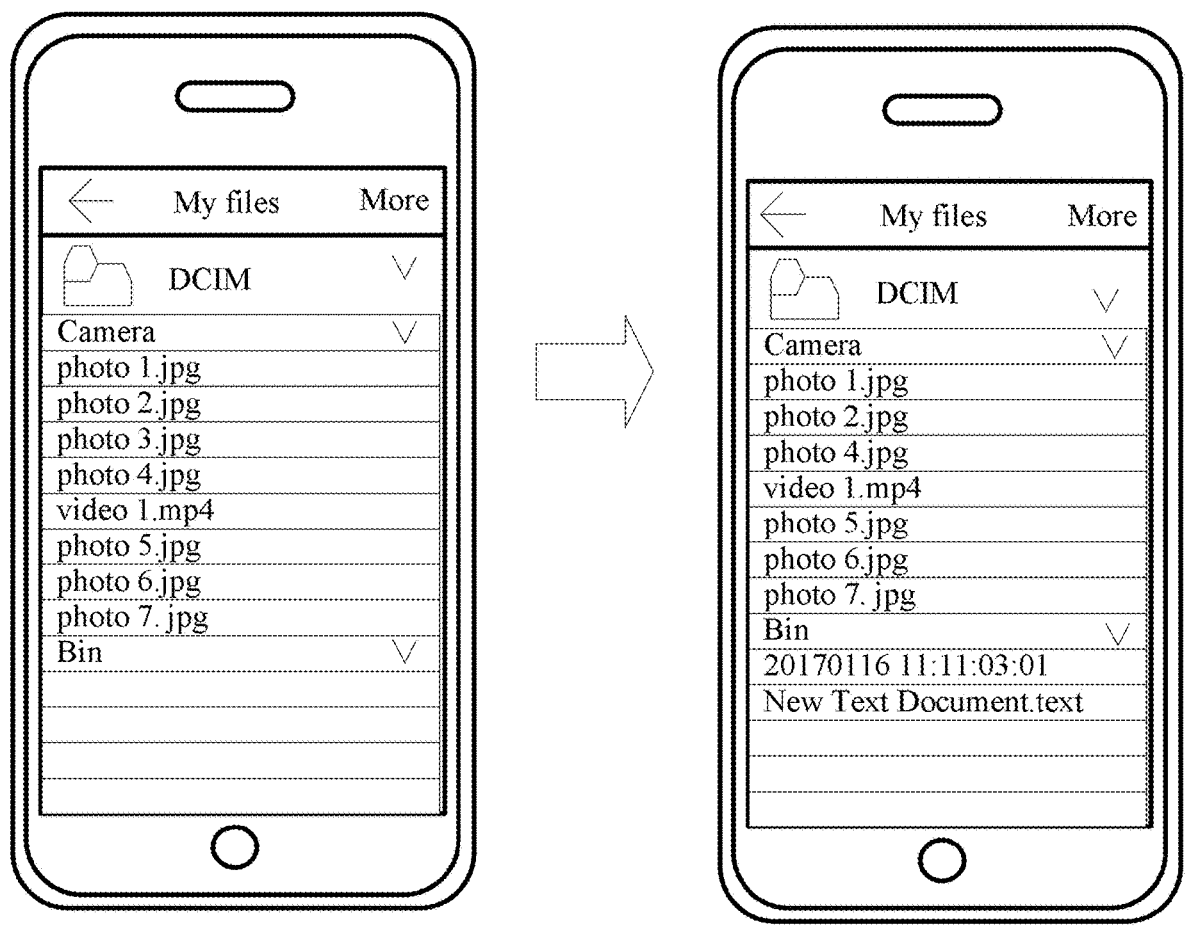
FIG. 3D is another schematic diagram in which a mobile terminal moves a first file from a first directory to a second directory according to an embodiment of this application.
Figure 3E:
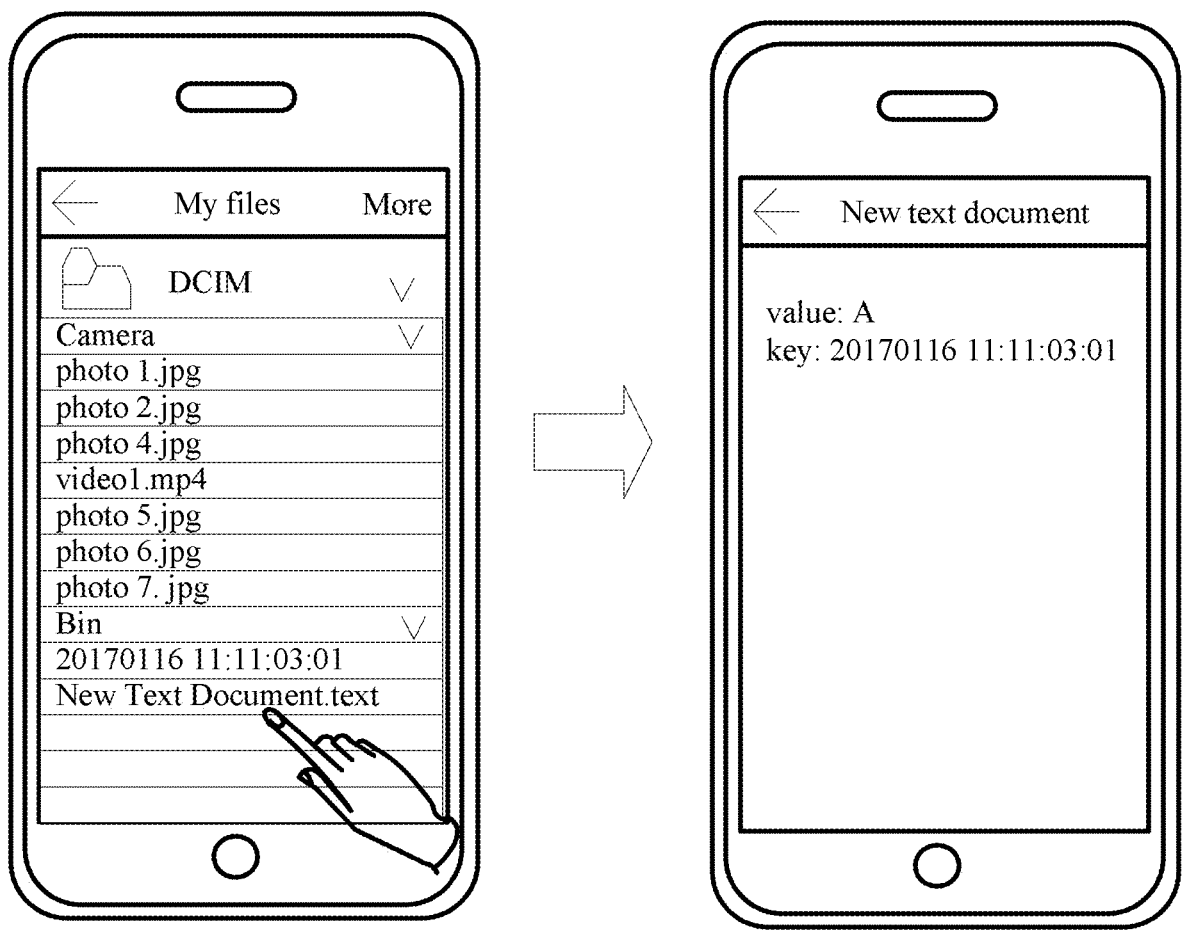
FIG. 3E is a schematic diagram of a binary file according to an embodiment of this application.

The following uses another scenario as an example for description. Of a deleted multimedia file (the first file), a deletion time is "20170116 11:11:03:01", a recycle bin file path is "Phone storage\DCIM\Bin", a source storage path of the first file is "Phone storage\DCIM\Camera\photo 3.jpg", a date taken time is "20170102 12:20", a picture orientation is "90°", a cloud identifier of the source album is "464135132428731234534", a hash value is "8a21589c6ac2413295d41d8955bbdcc1asdaa3542alsd21a-2sdlasd3sa56hth41464h131rD", and a cloud globally unique identifier of the first file is "6F9619FF-8B86-D011-B42D-00C04FC964FF". A character string is obtained by splicing these pieces of metadata, and a target character string (a character length of the target character string in this example is relatively long, and therefore the target character string is not presented herein. For ease of description, an "A" is used to represent the target character string) is obtained by using Base64 coding. A length of the target character string "A" exceeds 255 bytes, and the mobile terminal stores the target character string as a value in a binary file, stores the deletion time "20170116 11:11:03:01" as a key corresponding to the value in a binary file that is newly created in the second directory, as shown in FIG. 3E, and renames the first file as "20170116 11:11:03:01", as shown in FIG. 3D.

Manner 6: In this embodiment, the mobile terminal backs up a recycle bin data table (a first data table) to obtain a third data table. The third data table may be stored in another directory different from a directory corresponding to the first application, and when the mobile terminal clears application data of the first application, the third data table is not deleted.

Specifically, after receiving a delete instruction, the mobile terminal deletes metadata of the first file from the non-recycle-bin data table, adds the metadata corresponding to the first file to the recycle bin data table, and backs up all the metadata corresponding to the first file in the recycle bin data table to a second data table. To be specific, in the process of moving the first file from the first directory to the second directory, the mobile terminal stores, in the third data table, all the metadata corresponding to the first file in the recycle bin data table.

It should be understood that, after the mobile terminal receives the delete instruction, in addition to the foregoing manner, the mobile terminal may alternatively store the metadata of the first file in another manner, and may alternatively rename the first file in another manner. This is not specifically limited in this embodiment of this application.

It should also be understood that, the procedures of extracting and sorting the metadata and renaming the second file by the mobile terminal may be executed in the process of moving the first file from the first directory to the second directory, may be executed before the first file is moved from the first directory to the second directory, or may be executed after the first file is moved from the first directory to the second directory. This is not specifically in this application.

203. The mobile terminal deletes a first data table.

The mobile terminal obtains a clear application data instruction for the first application, and deletes application data of the first application. The application data includes a recycle bin data table (the first data table). Specifically, the clear application data instruction may be triggered by an operation entered by the user on a screen of the mobile terminal, as shown in FIG. 1H, or may be automatically triggered when an error occurs on an operating system or the first application. This is not specifically limited herein.

204. The mobile terminal obtains a third operation entered by the user, and in response to the third operation, generates a second data table.

After the mobile terminal deletes the application data of the first application, when receiving an instruction for starting the first application, the mobile terminal generates the second data table based on the stored metadata. Generating the second data table may be constructing a new recycle bin data table or recovering the deleted recycle bin data table.

Specific to different storage locations of metadata, the mobile terminal may construct the recycle bin data table in different manners. The following describes several of these manners.

Manner 1. The mobile terminal parses a filename of the first file (that is, the second name of the first file) in the second directory, to obtain metadata of the first file, and the mobile terminal constructs a recycle bin data table based on the metadata.

The following uses an example for description. A filename of the first file in the second directory is "0003 photo 3.jpg 20170116", as shown in the right diagram of FIG. 3A. The mobile terminal parses the filename of the first file to obtain an original filename "photo 3.jpg" and a recycled date "20170116", where a constructed recycle bin data table is described in Table 4.

TABLE 4

| File identifier | Source filename | Deletion time |
| --- | --- | --- |
| 0001 | Photo 3.jpg | 20170116 |

Manner 2. The mobile terminal decodes the filename of the first file in the second directory by using the Base64 coding scheme to obtain metadata of the first file, and then constructs the recycle bin data table based on the metadata.

The following uses a filename shown in the right diagram of FIG. 3B as an example for description. A filename of the first file in the second directory is "MDAwM+ebuOeJhzMuanBnMjAxN+W5tDHmnIgxNuaXpQ==". The mobile terminal decodes the target character string by using Base64 coding to obtain a character string "0003 photo 3.jpg 20170116", and parses the character string to obtain an original filename "photo 3.jpg" of the first file and a recycled date "20170116" of the first file. A constructed recycle bin data table is shown in Table 4.

The following uses a filename shown in the right diagram of FIG. 3C as an example for description. A filename of the first file in the second directory is "50mL5py65a2Y5Y KoX . . . (the character string is relatively long, and therefore following characters are omitted herein)". The mobile terminal decodes the target character string by using Base64 coding to obtain a character string "Phone storage\DCIM\Bin Phone storage\DCIM\Camera\photo 3.jpg 20170116 11:11:03:01 20170102 12:20 90°", and parses the character string to obtain a recycle bin path "Phone storage\DCIM\Bin", a source storage path "Phone storage\DCIM\Camera\photo 3.jpg" of the first file, a deletion time "20170116 11:11:03:01" of the first file, a date taken time "20170102 12:20" of the first file, and a picture orientation "90°" of the first file. A constructed recycle bin data table is described in Table 5.

newly created in the second directory, searches for a target character string matching the filename (the deletion time) of the first file, decodes the target character string by using the Base64 coding scheme to obtain metadata of the first file, and constructs a recycle bin data table based on the metadata.

The following uses a filename shown in the right diagram of FIG. 3D as an example for description. A filename of the first file in the second directory is "20170116 11:11:03:01". The mobile terminal determines that the filename is a timestamp, and the mobile terminal reads data from a binary file newly created in a second directory, and determines that a target character string in the binary file that is corresponding to "20170116 11:11:03:01" is "A", as shown in FIG. 3E. The mobile terminal decodes the target character string "A" by using the Base64 coding scheme to obtain a character string "Phone storage\DCIM\Bin Phone storage\DCIM\Camera\photo 3.jpg 20170116 11:11:03:01 20170102 12:20 3sa56hth41464h131rD6F9619FF-8B86-D011-B42D-00C04FC964FF". The mobile terminal parses the character string to obtain a recycle bin file "Phone storage\DCIM\Bin", a source storage path "Phone storage\DCIM\Camera\photo 3.jpg" of the first file, a deletion time "jpg 20170116 11:11:03:01" of the first file, a date taken time "0120170102 12:20" of the first file, a picture orientation "90°" of the first file, a cloud identifier "464135132428731234534" of the source album to which the first file belongs, a hash value "8a21589c6ac2413295d41d8955bbdcc1asdaa3542a1sd21a-2sd1asd3sa56hth41464h131r" of the first file, and a cloud globally unique identifier "D6F9619FF-8B86-D011-B42D-00C04FC964FF" of the first file. A constructed recycle bin data table is described in Table 6.

TABLE 6

| File identifier | Recycle bin path | Source storage path | Recycled time | Date taken | Picture orientation | Cloud identifier of a source album | Hash value | Cloud globally unique identifier |
| --- | --- | --- | --- | --- | --- | --- | --- | --- |
| 0001 | Phone storage\DCIM\Bin | Phone storage\DCIM\Camera\photo 3.jpg | 20170116 11:11:03:01 | 20170102 12:20 | 90° | 464135132428731234534 | 8a21589c6ac2413295d41d8955 . . . | D6F9619FF-8B86-D011-B42D-00C04FC964FF |

TABLE 5

| File identifier | Recycle bin path | Source storage path | Recycled time | Date taken | Picture orientation |
| --- | --- | --- | --- | --- | --- |
| 0001 | Phone storage\DCIM\Bin | Phone storage\DCIM\Camera\photo 3.jpg | 20170116 11:11:03:01 | 20170102 12:20 | 90° |

Manner 3. The mobile terminal determines whether the filename of the first file in the second directory is a timestamp, that is, determines whether a format of the filename is a time format. If the filename is not in a time format, the mobile terminal decodes the filename of the first file in the second directory by using the Base64 coding scheme to obtain metadata of the first file. If the filename is in a time format, the mobile terminal reads data from a binary file Manner 4. The mobile terminal determines whether the filename of the first file in the second directory is a timestamp, that is, determines whether a format of the filename is a time format. If the filename is not in a time format, the mobile terminal decodes the filename of the first file in the second directory by using the Base64 coding scheme, and decompresses data obtained through parsing to obtain metadata of the first file. If the filename is in a time format, the mobile terminal reads data from a binary file newly created in the second directory, searches for a target character string matching the filename (the deletion time) of the first file, decodes the target character string by using the Base64 coding scheme, decompresses data obtained through parsing to obtain metadata of the first file, and constructs a recycle bin data table based on the metadata.

Manner 5. The mobile terminal generates the second data table based on the third data table. The mobile terminal may specifically copy content of the third data table to obtain the second data table, or may use the third data table as the second data table by moving the third data table to a directory corresponding to the first application.

Figure 4:
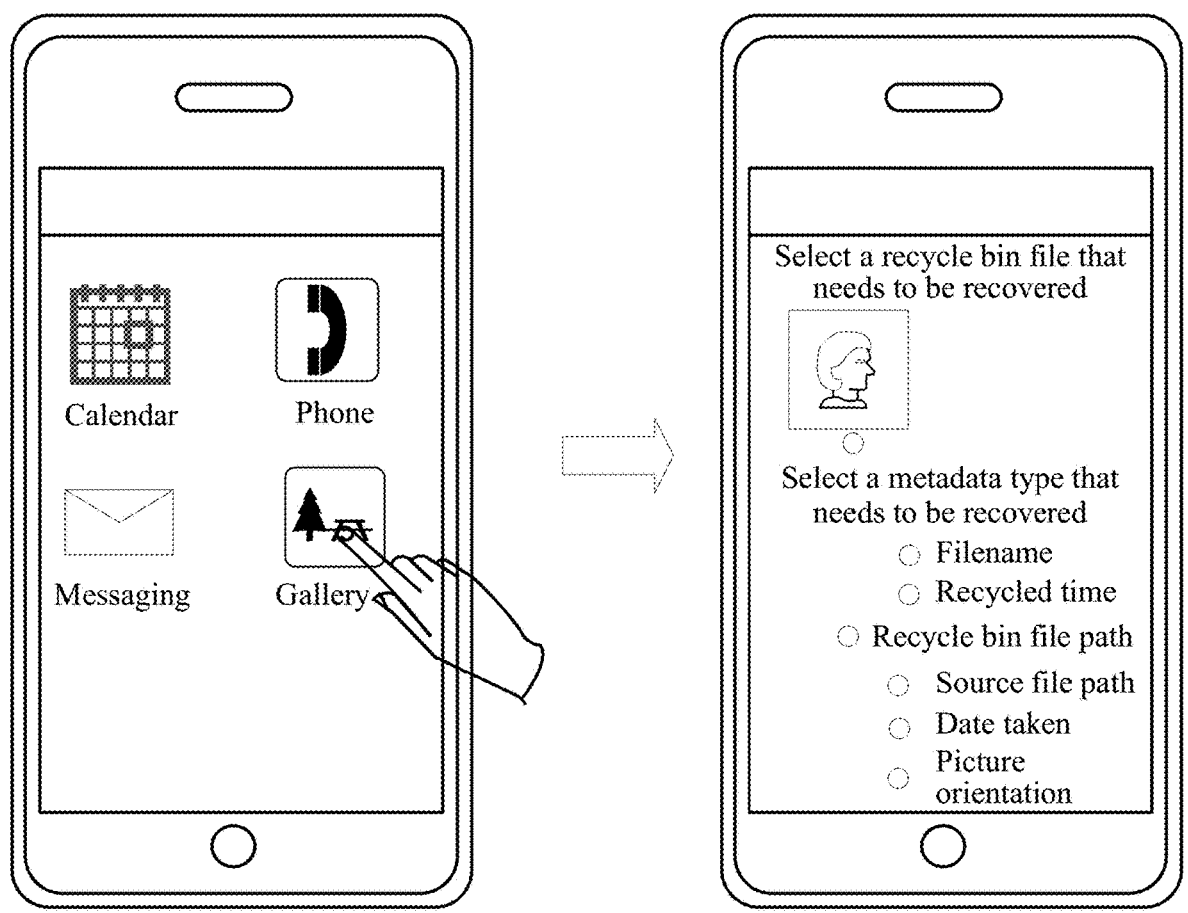
FIG. 4 is a schematic diagram of a selection screen according to an embodiment of this application.

It should be understood that the mobile terminal may present a selection screen before constructing the recycle bin data table, as shown in FIG. 4. The selection screen is used to prompt the user to select a recycle bin file that needs to be recovered and metadata that needs to be recovered, and then the recycle bin data table is constructed based on the file and the metadata that are selected by the user on the selection screen. The mobile terminal may present the selection screen after constructing the recycle bin data table. The selection screen is used to prompt the user to select a recycle bin file that needs to be recovered, and then the file selected by the user is displayed on the recycle bin screen based on the constructed recycle bin data table. Optionally, for a recycle bin file not selected by the user, the mobile terminal may automatically delete the recycle bin file permanently.

After the mobile terminal generates the second data table on the recycle bin screen, when receiving an instruction for opening the recycle bin screen, the mobile terminal displays the first file on the recycle bin screen based on the second data table.

Figure 5A:
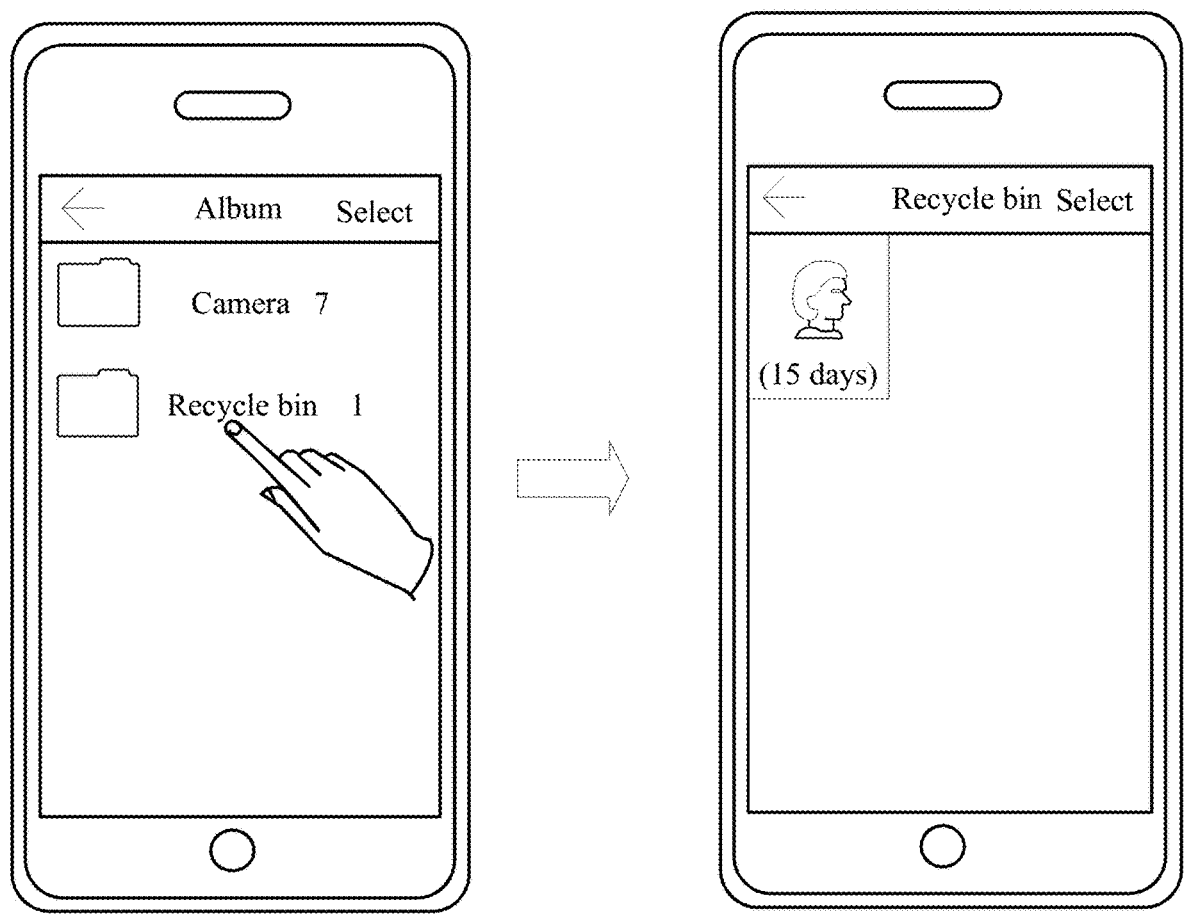
FIG. 5A is a schematic diagram in which a mobile terminal displays a first file on a recycle bin screen according to an embodiment of this application.

Specifically, the recycle bin screen may be a screen displaying a thumbnail of the recycle bin file, as shown in FIG. 5A. The user taps an icon corresponding to a recycle bin album, and the mobile terminal displays a thumbnail of the first file.

Figure 5B:
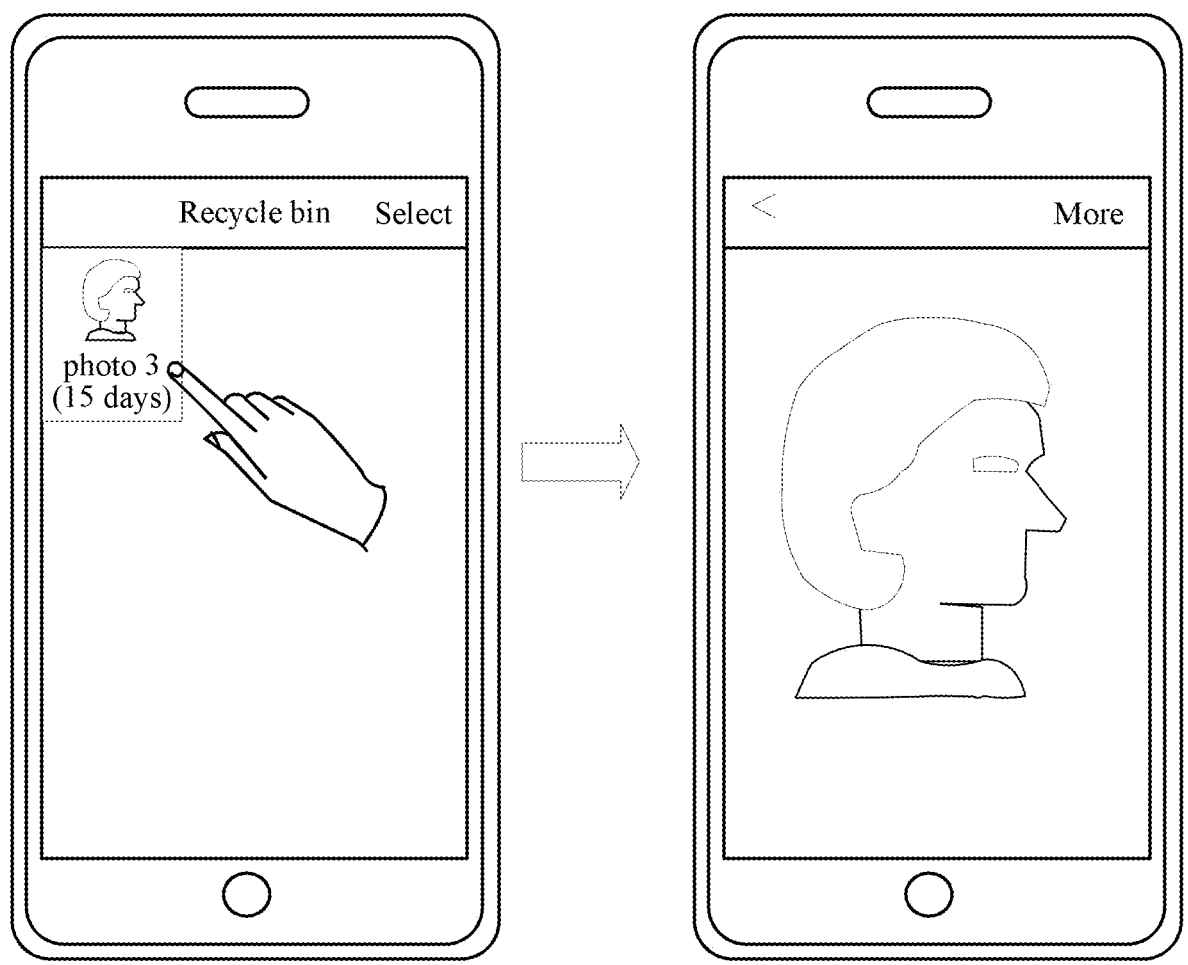
FIG. 5B is another schematic diagram in which a mobile terminal displays a first file on a recycle bin screen according to an embodiment of this application.

The recycle bin screen may be an edit screen of the recycle bin file, as shown in FIG. 5B. The user taps a thumbnail of the first file, and the mobile terminal displays an edit screen of the first file.

In this embodiment of this application, after the recycle bin data table is deleted, the mobile terminal can generate a new recycle bin data table, so that the mobile terminal can still display the first file on the recycle bin screen after application data is cleared, and the user can permanently delete or recover the first file on the recycle bin screen, thereby improving user experience.

This embodiment of this application provides a plurality of manners of generating the second data table, improving flexibility of the solution.

Figure 5C:
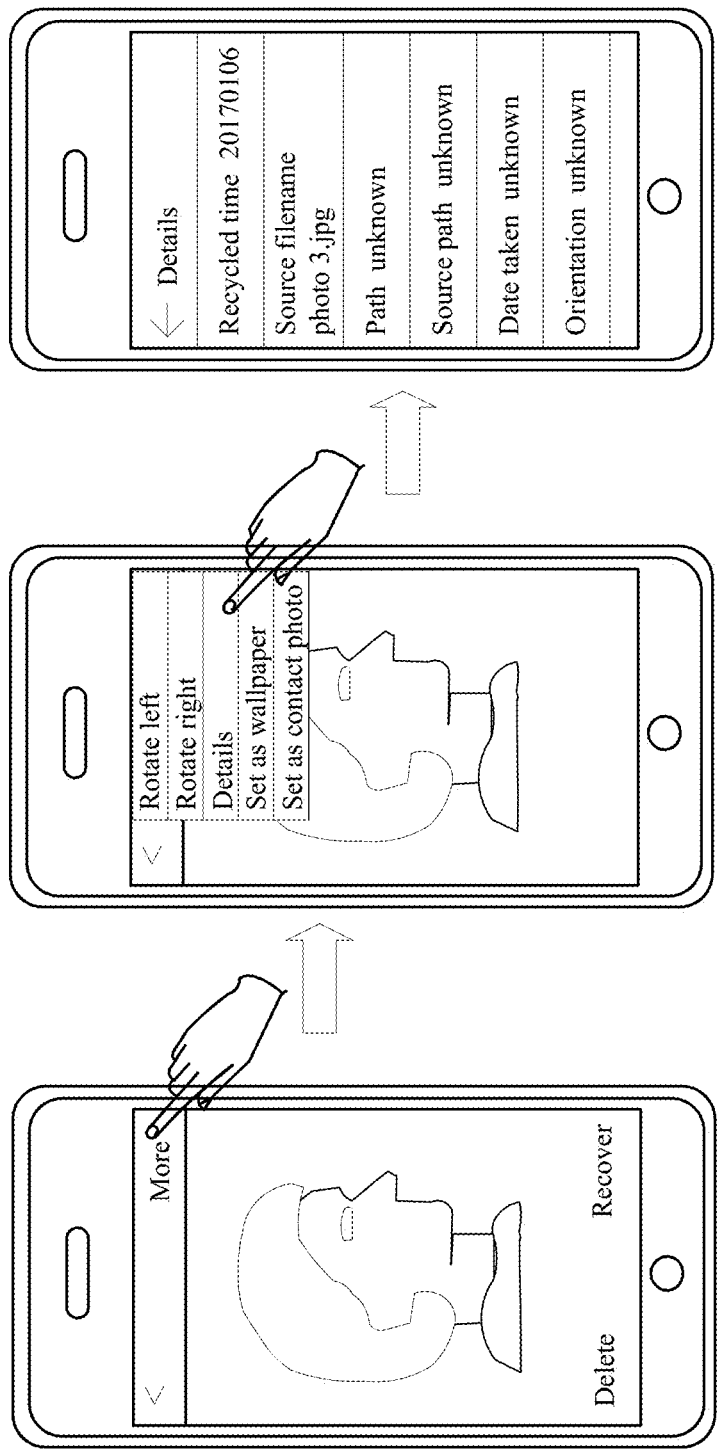
FIG. 5C is another schematic diagram in which a mobile terminal displays metadata of a first file according to an embodiment of this application.
Figure 5D:
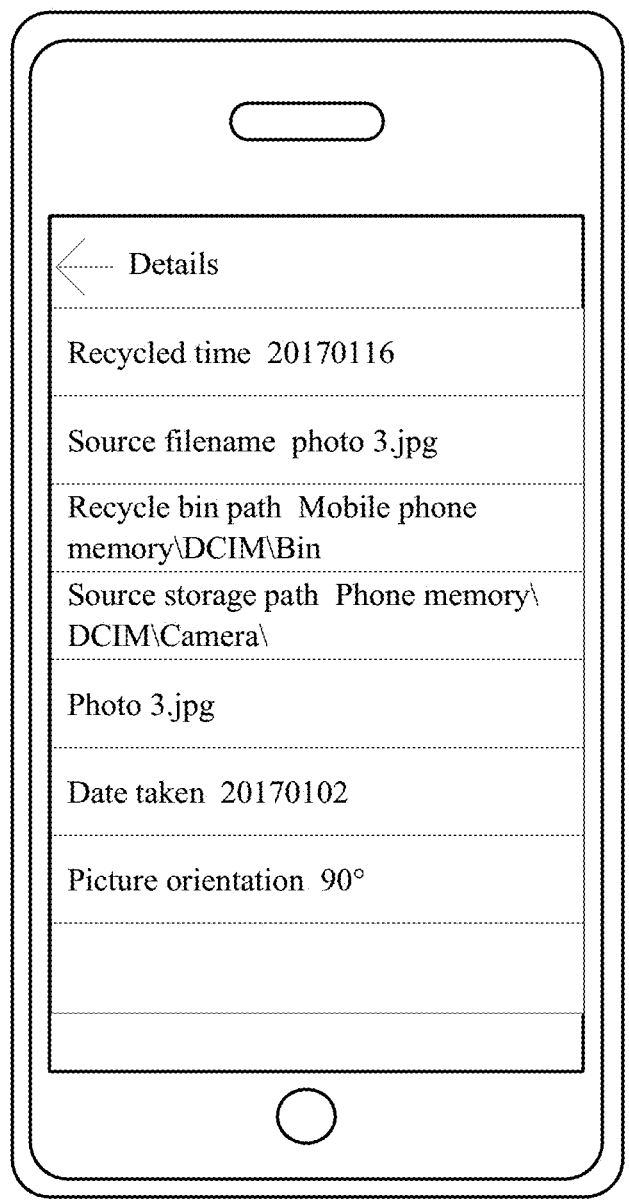
FIG. 5D is another schematic diagram in which a mobile terminal displays metadata of a first file according to an embodiment of this application.
Figure 5E:
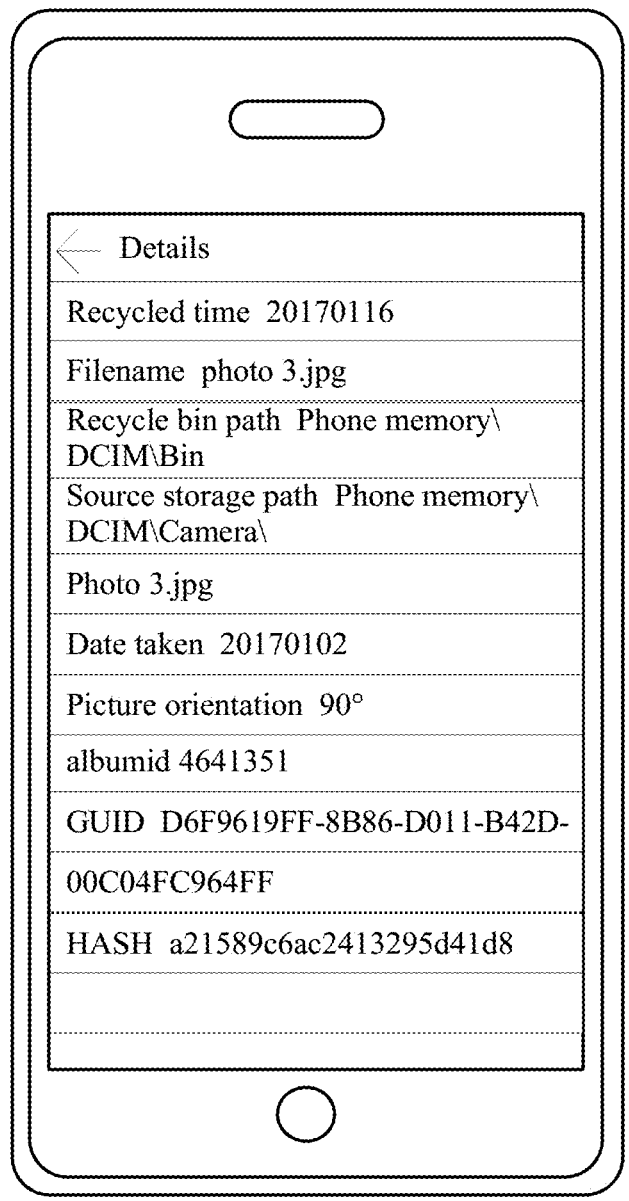
FIG. 5E is another schematic diagram in which a mobile terminal displays metadata of a first file according to an embodiment of this application.

Based on the embodiment corresponding to FIG. 2, in some embodiments, after the mobile terminal displays the first file on the recycle bin screen, the user may enter a sixth operation on the screen, and in response to the sixth operation, the mobile terminal may display metadata of the first file. As shown in FIG. 5C, the user taps a details function key (the sixth operation) in an edit screen of the first file, and the mobile terminal displays metadata of the first file based on the second data table. It should be understood that, based on different types of metadata included in the second data table, the mobile terminal displays different metadata. FIG. 5C merely shows a deletion time and an original filename of the first file. Further, in some scenarios, the mobile terminal may further display a current path of the first file, a source storage path of the first file, a date taken time of the first file, and a picture orientation of the first file, as shown in FIG. 5D. Still further, the mobile terminal may further display an album identifier of an album to which the first file belongs, a cloud globally unique identifier of the first file, and a hash value of the first file, as shown in FIG. 5E.

In this embodiment, the mobile terminal may display metadata included in the second data table, so that the user can learn details of the first file, thereby improving user experience.

In some embodiments, when the mobile terminal establishes a connection to a cloud server, after the mobile terminal deletes application data, the mobile terminal automatically downloads multimedia files from the cloud server, and displays multimedia files downloaded from a cloud recycle bin on the recycle bin screen. Among these multimedia files, there may be a file that is the same as the first file, and therefore a plurality of identical photos or a plurality of identical videos are displayed on the recycle bin screen.

In an optional implementation, in this embodiment, before the mobile terminal displays the first file on the recycle bin screen, if the cloud globally unique identifier (Cloud GUID) of the first file that is included in the second data table is not 0, the mobile terminal may associate the first file and a second file corresponding to the cloud globally unique identifier in the cloud server, and display the second file and the first file in fusion, that is, display only the first file or only the second file. Specifically, the mobile terminal may not download the second file from the cloud server to the mobile terminal, and displays only the first file on the recycle bin screen. Alternatively, after downloading the second file from the cloud server to the mobile terminal, the mobile terminal may select either of the first file and the second file for display on the recycle bin screen, thereby avoiding that the mobile terminal displays identical content repeatedly.

For example, in a scenario corresponding to Table 6, the cloud globally unique identifier corresponding to the first file is "D6F9619FF-8B86-D011-B42D-00C04FC964FF", and the mobile terminal may search the cloud server for a second file whose globally unique identifier is "D6F9619FF-8B86-D011-B42D-00C04FC964FF", and then display only the first file on the recycle bin screen, without displaying the second file.

This embodiment provides a manner for avoiding that the mobile terminal displays identical files repeatedly on the recycle bin screen, thereby improving flexibility of the solution.

In an optional manner, in this embodiment, before the mobile terminal displays the first file on the recycle bin screen, if the recycle bin data table includes the cloud identifier of the source album to which the first file belongs and the hash value of the first file, the mobile terminal may associate the first file and the second file, in the cloud server, that is corresponding to the hash value and the cloud identifier of the source album to which the first file belongs, and display the second file and the first file in fusion, that is, display only the first file or only the second file. Specifically, the mobile terminal may not download the second file from the cloud server to the mobile terminal, and displays only the first file on the recycle bin screen. Alternatively, after downloading the second file from the cloud server to the mobile terminal, the mobile terminal may select either of the first file and the second file for display on the recycle bin screen, thereby avoiding that the mobile terminal displays identical content repeatedly.

For example, in the scenario corresponding to Table 6, if the hash value of the first file is "8a21589c6ac2413295d41d8955bbdcclasdaa3542alsd21a2-sdlasd3sa56hth41464h131r", and the cloud identifier of the source album to which the first file belongs is "464135132428731234534", the mobile terminal can find, in the cloud server, a second file whose hash value is consistent with the hash value and whose cloud identifier of a source album is consistent with the cloud identifier of the source album, and then displays only the first file on the recycle bin screen, without displaying the second file.

This embodiment provides another manner for avoiding displaying identical files repeatedly on the recycle bin screen, thereby improving flexibility of the solution.

It should be noted that, after the mobile terminal displays the first file on the recycle bin screen, the first file may be recovered according to a recover instruction entered by the user in the operation screen. It should be understood that the first file can be recovered to different degrees based on different types of metadata included in the second data table.

In an optional implementation, the source album to which the first file belongs is a first album. To be specific, before the user deletes the first file on the first screen (before the mobile terminal obtains the second operation entered by the user on the first screen), the first file belongs to the first album. If the second data table does not include the source storage path of the first file, the mobile terminal is unable to recover the first file to the source album. After obtaining a recover instruction, the mobile terminal recovers the first file to a target album.

The target album is a system- or user-specified album, and is used by the user to manage a multimedia file recovered on the recycle bin screen. Recovering the first file to the target album means changing an album to which the first file belongs from the recycle bin album to the target album. The following uses a scenario corresponding to Table 4 as an example for description. The second data table includes the deletion time of the first file and the original filename of the first file.

Figure 6A:
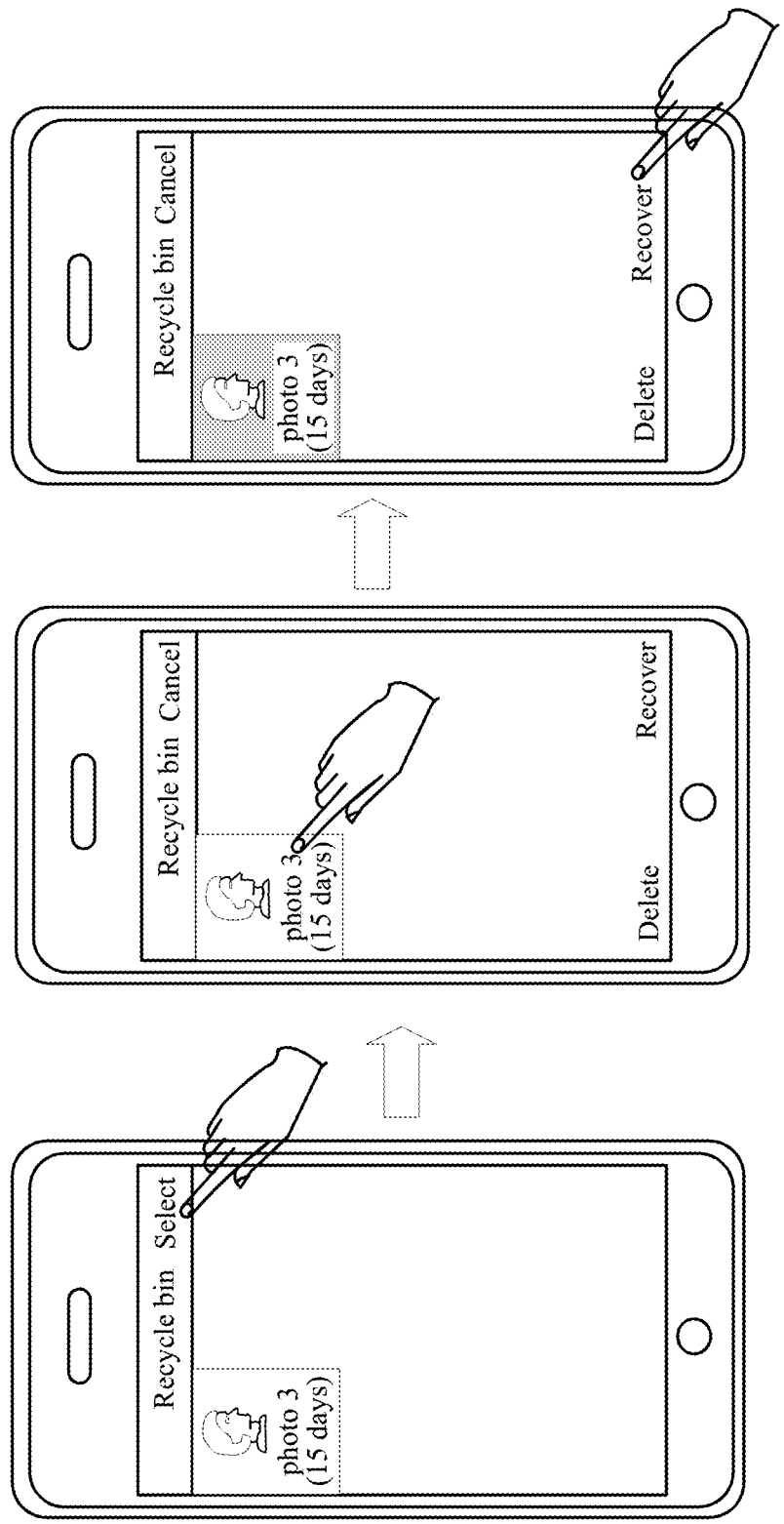
FIG. 6A is a schematic diagram in which a user enters a recover instruction on a recycle bin screen according to an embodiment of this application.
Figure 6B:
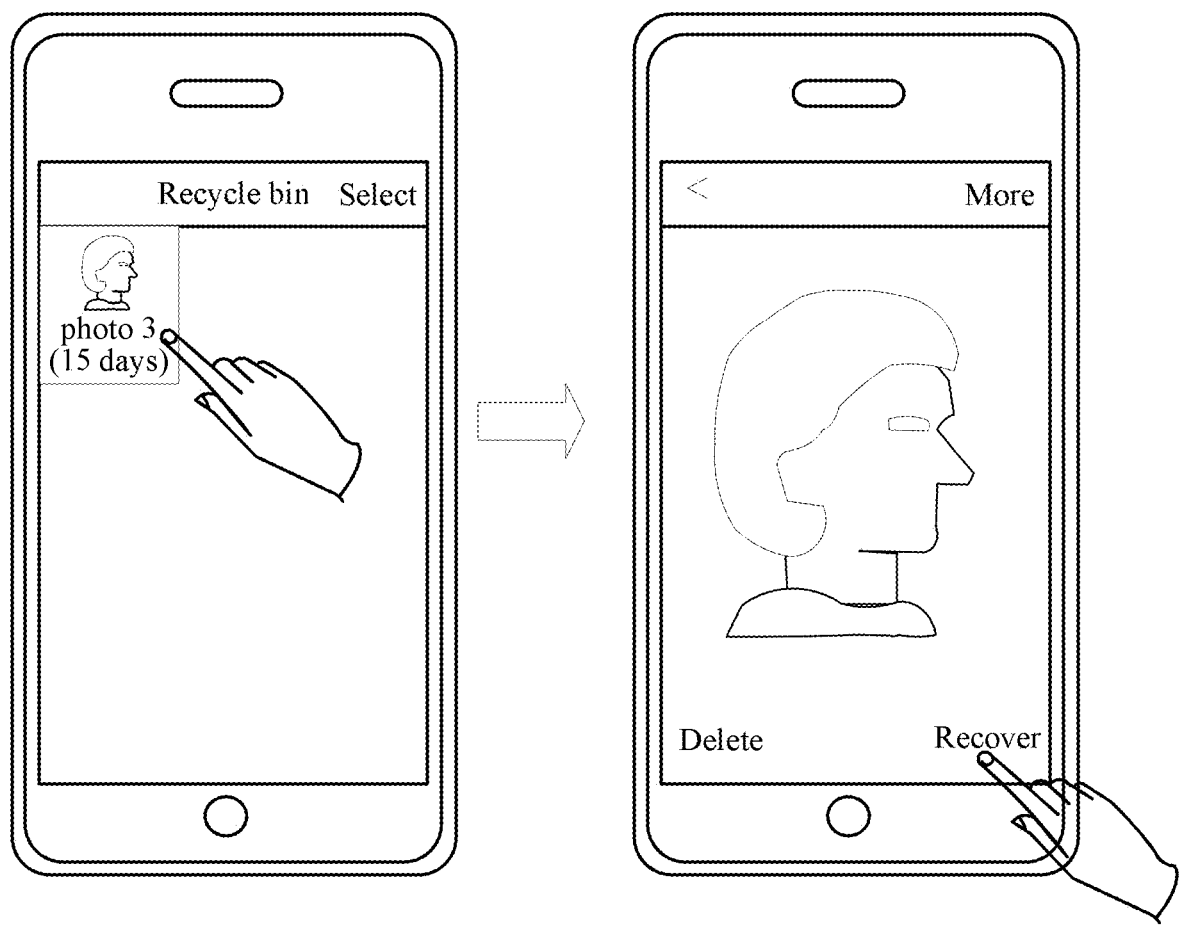
FIG. 6B is another schematic diagram in which a user enters a recover instruction on a recycle bin screen according to an embodiment of this application.
Figure 6C:
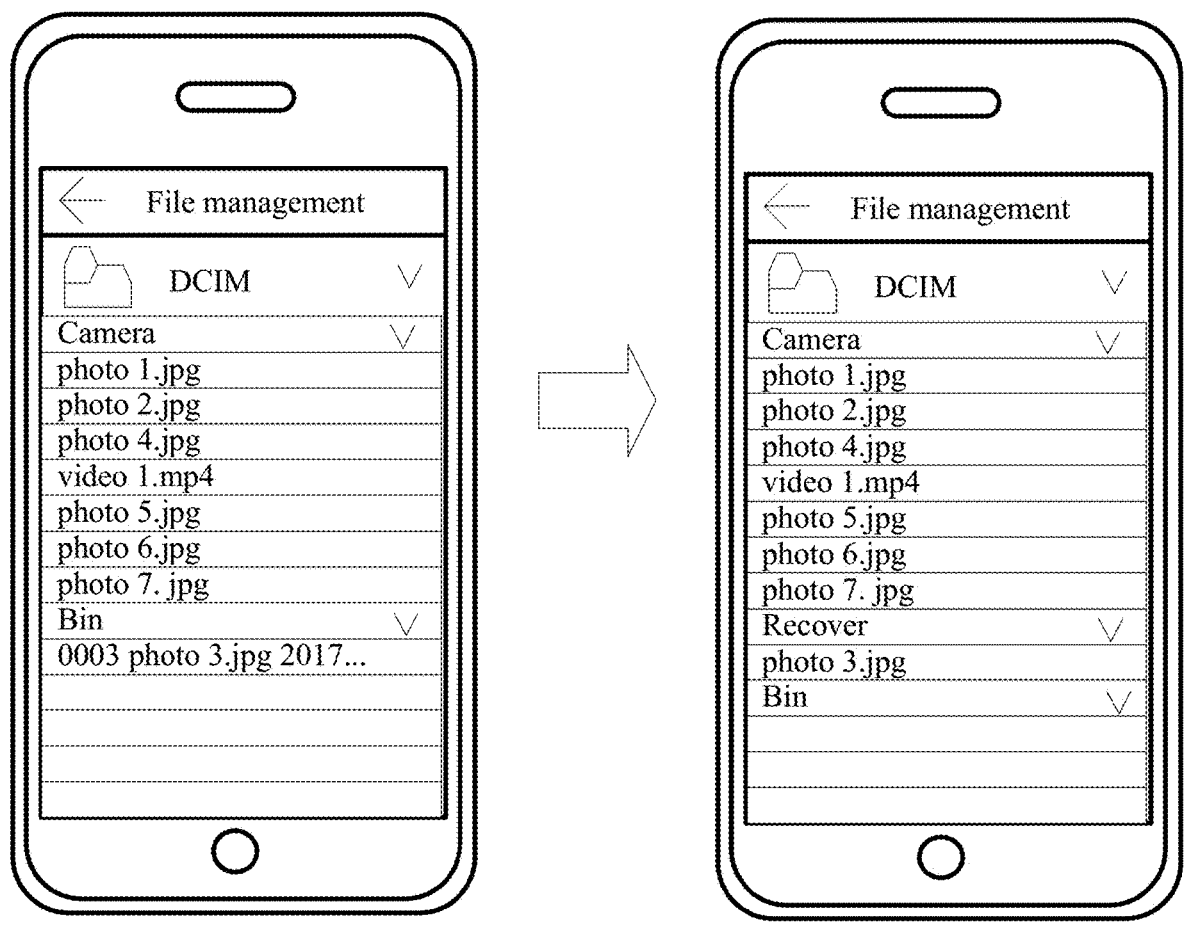
FIG. 6C is a schematic diagram in which a mobile terminal moves a first file from a second directory to a target directory according to an embodiment of this application.
Figure 6D:
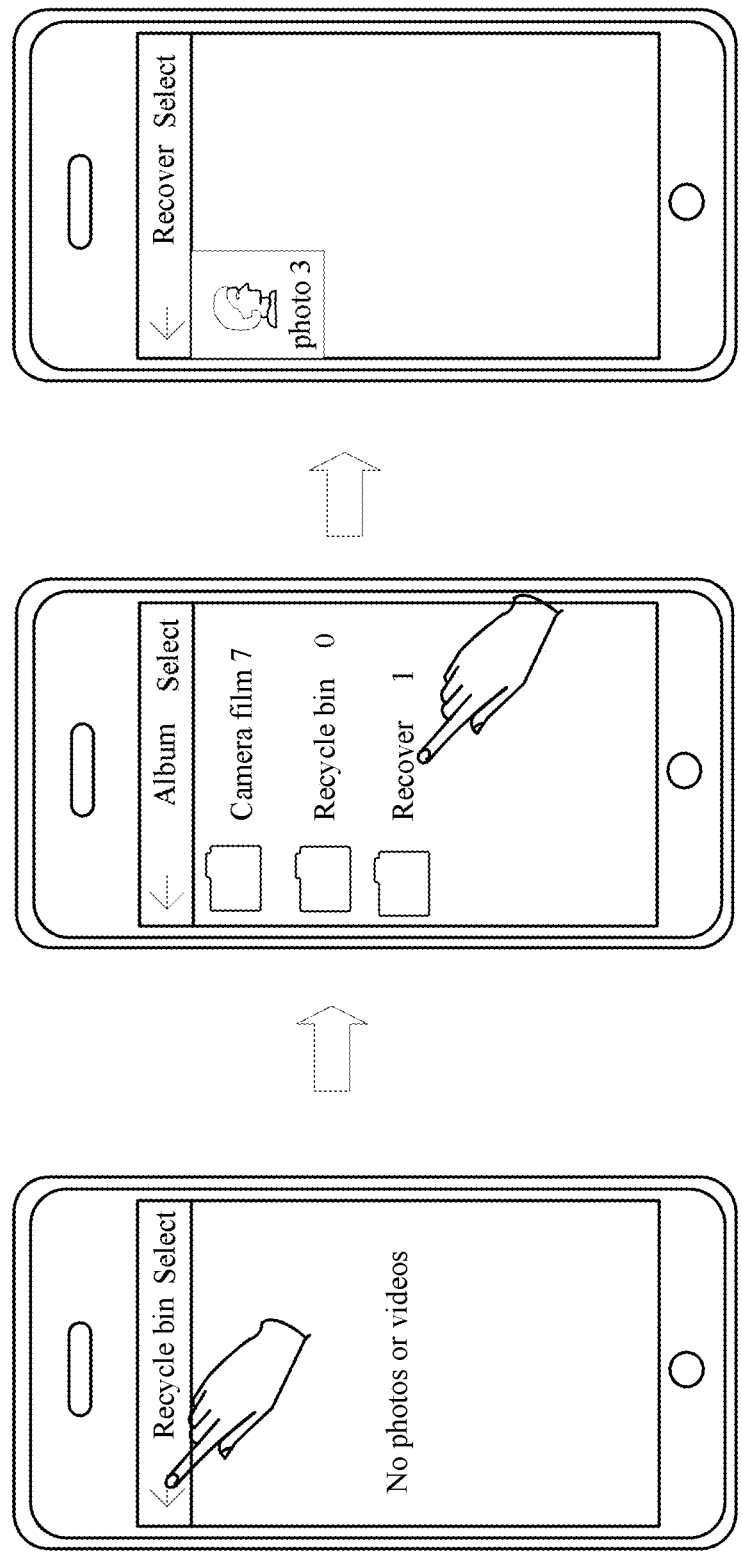
FIG. 6D is a schematic diagram in which a mobile terminal recovers a first file to a target album according to an embodiment of this application.

In this scenario, the mobile terminal receives a recover instruction entered by the user on the operation screen. As shown in FIG. 6A or FIG. 6B, the user selects the first file that needs to be recovered, and taps a recover icon to recover the first file. After receiving the recover instruction, the mobile terminal moves the first file from the second directory to a target directory, and changes the filename of the first file back to the original filename (the first name), as shown in FIG. 6C. The target directory is used to store a multimedia file in the target album. After the user enters the recover instruction on the recycle bin screen, the recovered first file is not included on the recycle bin screen presented by the mobile terminal. When the mobile terminal receives an instruction for opening the target album, the mobile terminal displays the recovered first file on a screen corresponding to the target album, as shown in FIG. 6D.

In this embodiment, after application data is deleted, the mobile terminal can recover the first file to a system-specified album, thereby improving flexibility of the solution.

In an optional implementation, the source album to which the first file belongs is a first album. To be specific, before the user deletes the first file on the first screen (before the mobile terminal obtains the second operation entered by the user on the first screen), the first file belongs to the first album. If the second data table includes the source storage path of the first file, the mobile terminal can recover the first file to the source album. After obtaining the recover instruction, the mobile terminal recovers the first file to the first album, that is, changes an album to which the first file belongs from the recycle bin album to the first album.

The following uses a scenario corresponding to Table 5 as an example for description. The second data table includes the recycle bin path, the source storage path, the deletion time, the date taken time, and the picture orientation that are of the first file.

Figure 7A:
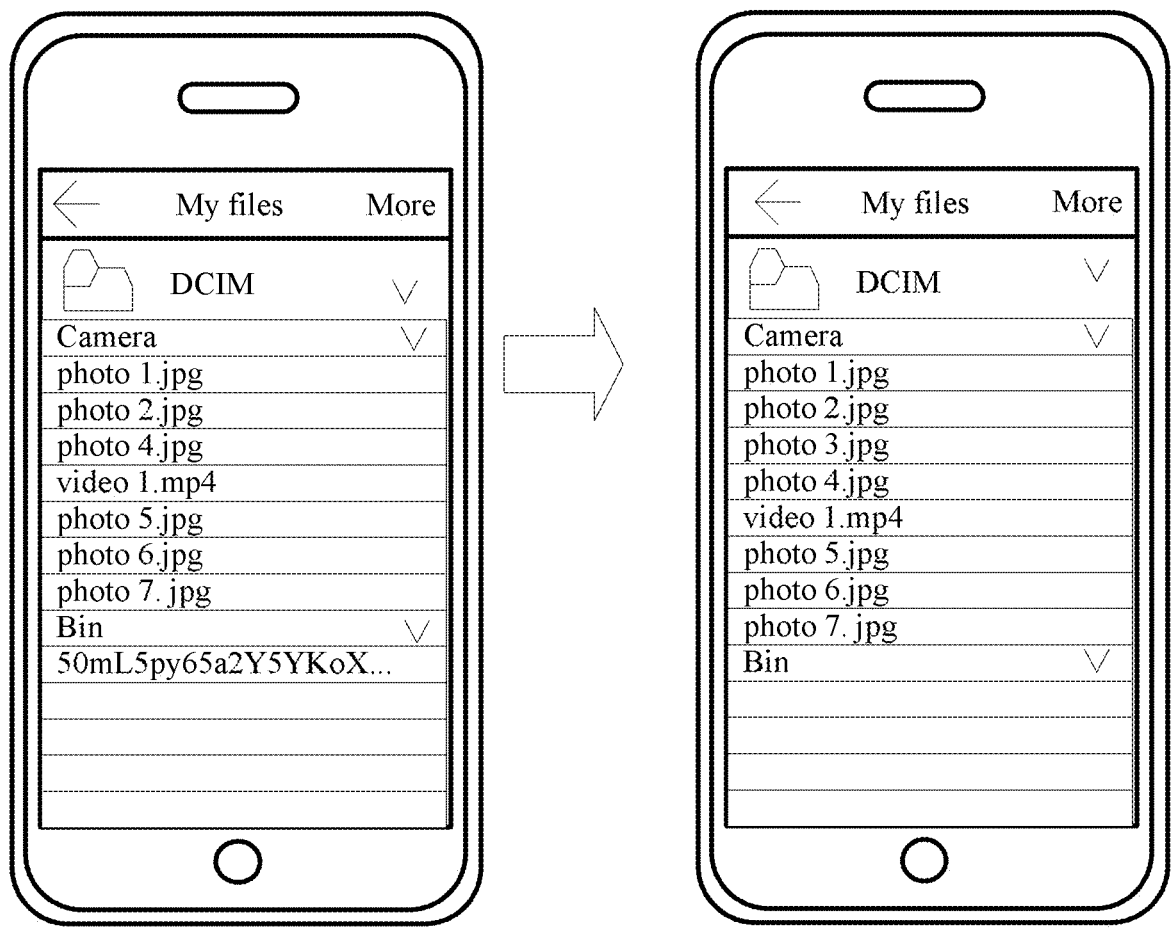
FIG. 7A is a schematic diagram in which a mobile terminal moves a first file from a second directory to a first directory according to an embodiment of this application.
Figure 7B:
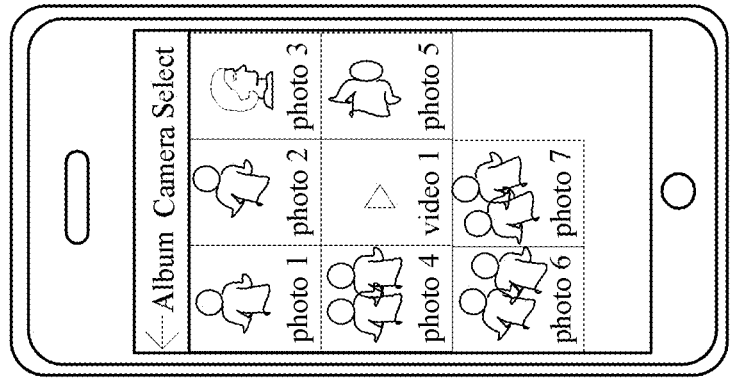
FIG. 7B is a schematic diagram in which a mobile terminal recovers a first file to a source album according to an embodiment of this application.
Figure 7B:
Figure 7B:
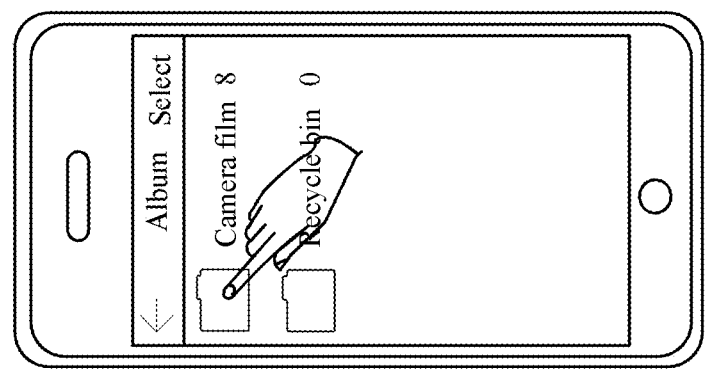
Figure 7B:
Figure 7B:
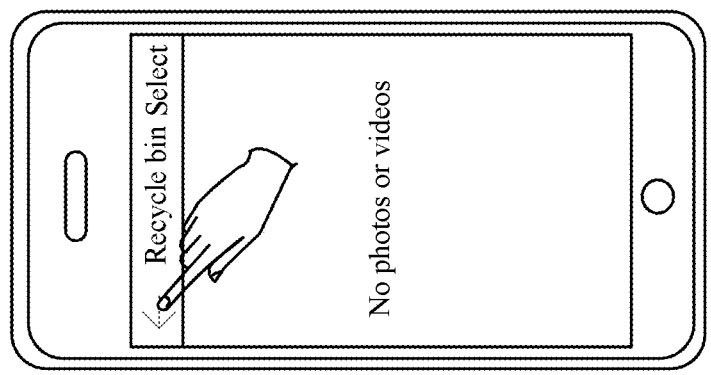

In this scenario, after receiving a recover instruction entered on the operation screen by the user, the mobile terminal moves, based on the source storage path, the first file from the second directory to the first directory, changes the filename of the first file back to the original filename (the first name), that is, recovers the first file from the recycle bin directory to a source directory, as shown in FIG. 7A. After the user enters the recover instruction on the recycle bin screen, the recovered first file is not included on the recycle bin screen presented by the mobile terminal. After the mobile terminal receives an instruction for opening a source album, the mobile terminal displays the recovered first file in the source album, as shown in FIG. 7B.

In this embodiment, after application data is deleted, the mobile terminal can recover the first file to the source album, thereby improving flexibility of the solution.

It should be further noted that, after the mobile terminal displays the first file on the recycle bin screen, the mobile terminal may permanently delete the first file according to a delete instruction entered by the user on the operation screen, that is, delete the first file from the mobile terminal.

Figure 8A:
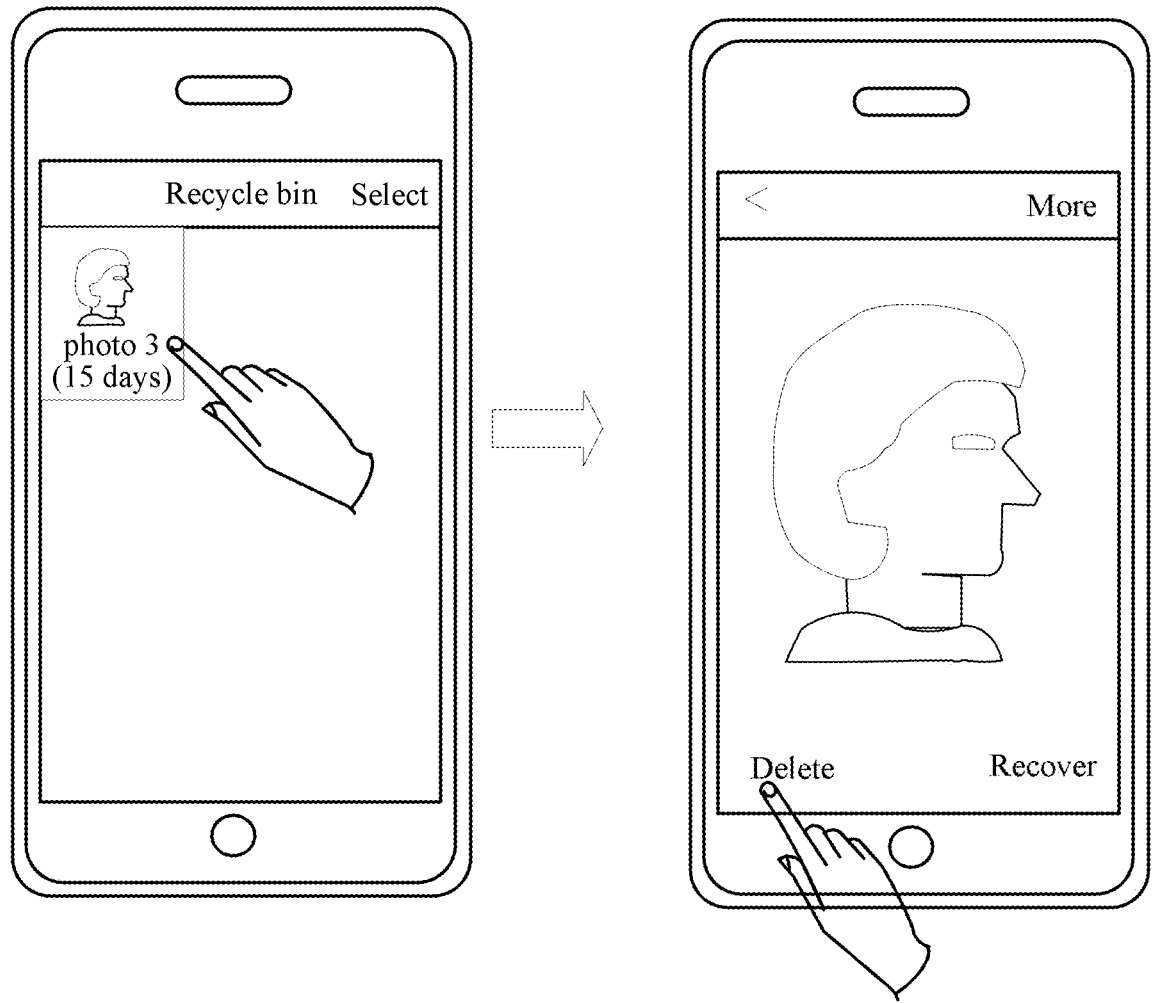
FIG. 8A is a schematic diagram in which a user enters a delete instruction on a recycle bin screen according to an embodiment of this application.
Figure 8B:
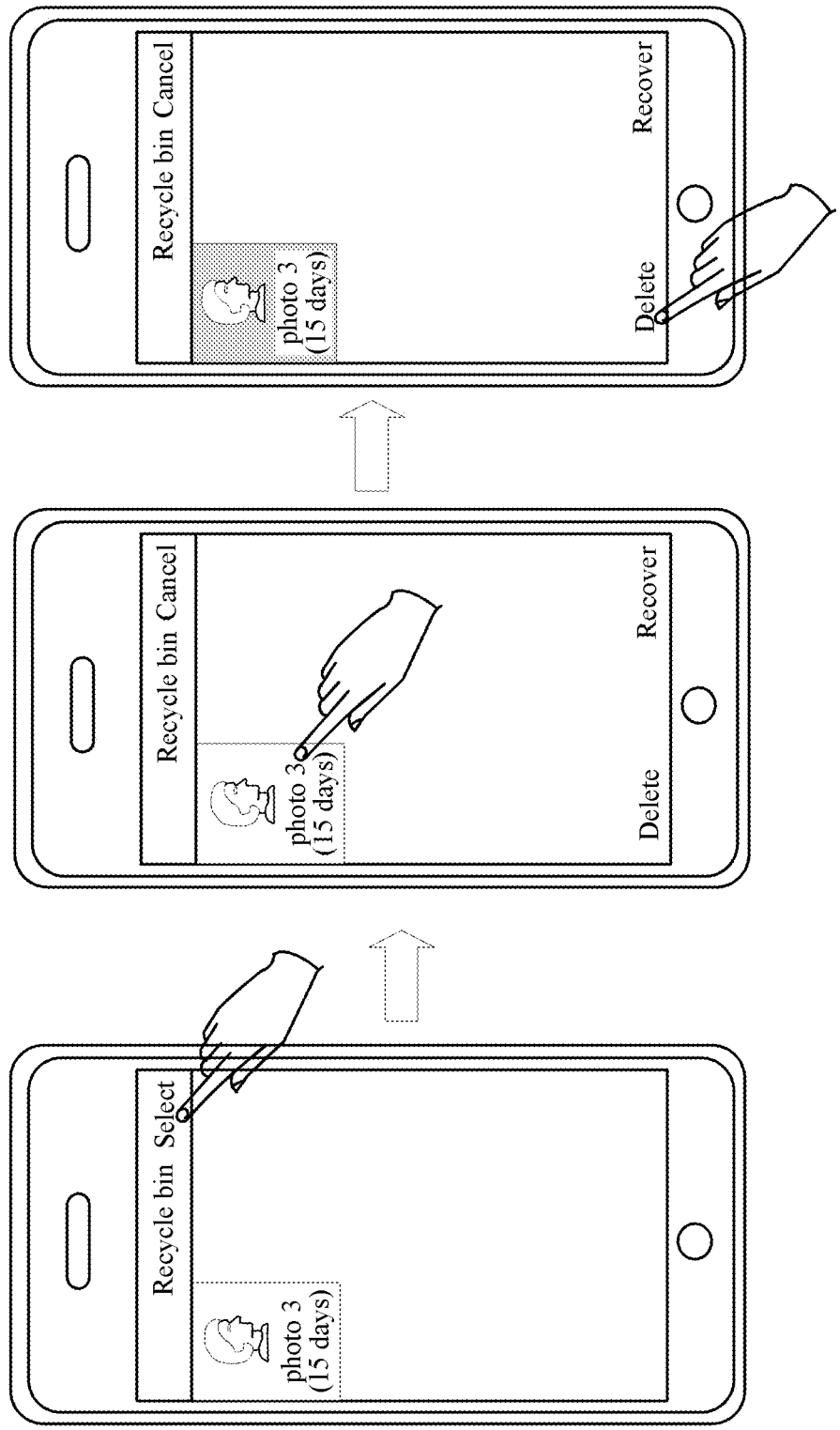
FIG. 8B is a schematic diagram in which a user enters a delete instruction on a recycle bin screen according to an embodiment of this application.
Figure 8C:
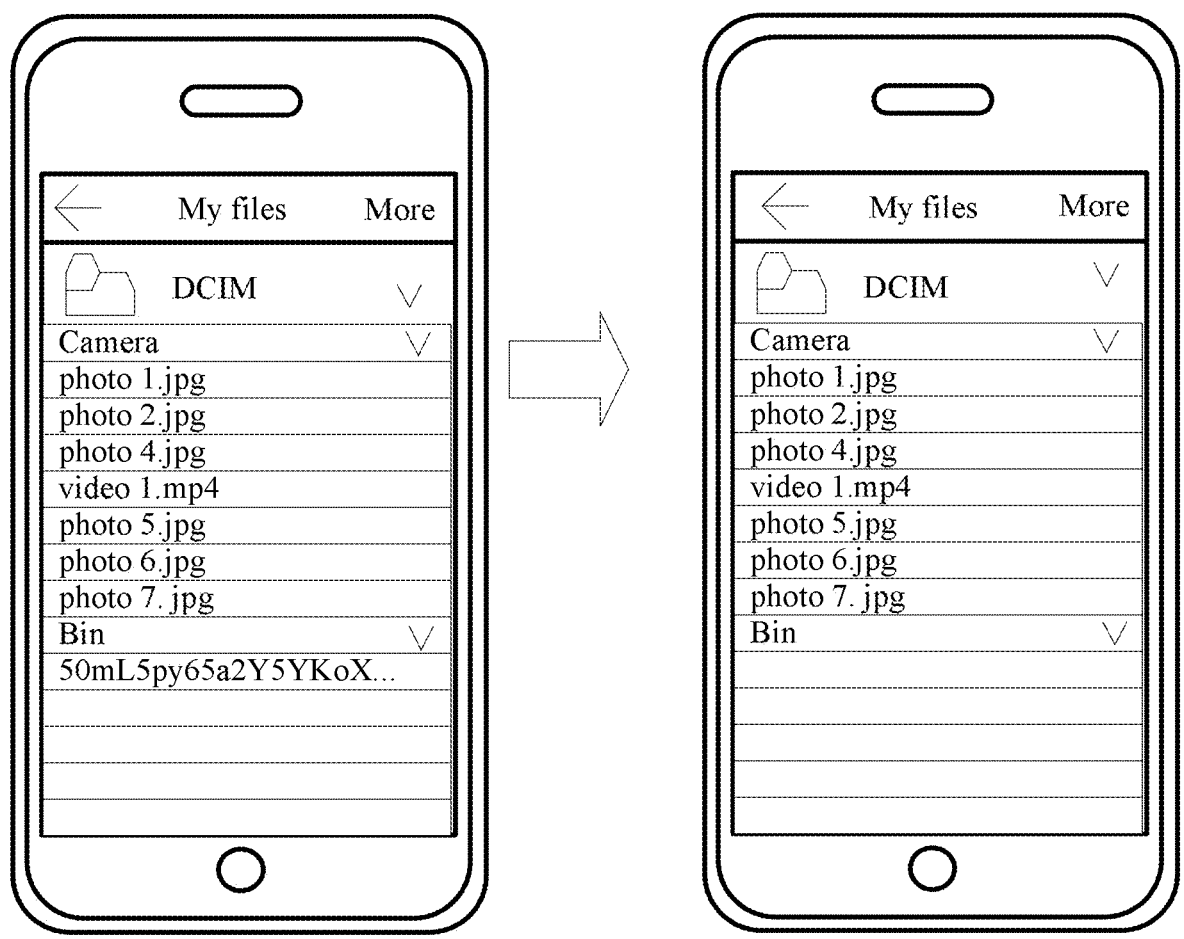
FIG. 8C is a schematic diagram in which a mobile terminal deletes a first file from the mobile terminal according to an embodiment of this application.

As shown in FIG. 8A or FIG. 8B, the user selects, on the recycle bin screen, the first file that needs to be deleted, and taps a delete icon to delete the first file. After obtaining the operation, the mobile terminal deletes the first file from the second directory, that is, permanently deletes the first file from the mobile terminal, as shown in FIG. 8C.

In this embodiment, the mobile terminal can permanently delete the first file after application data is deleted, to increase available storage space of the mobile terminal.

Figure 9:
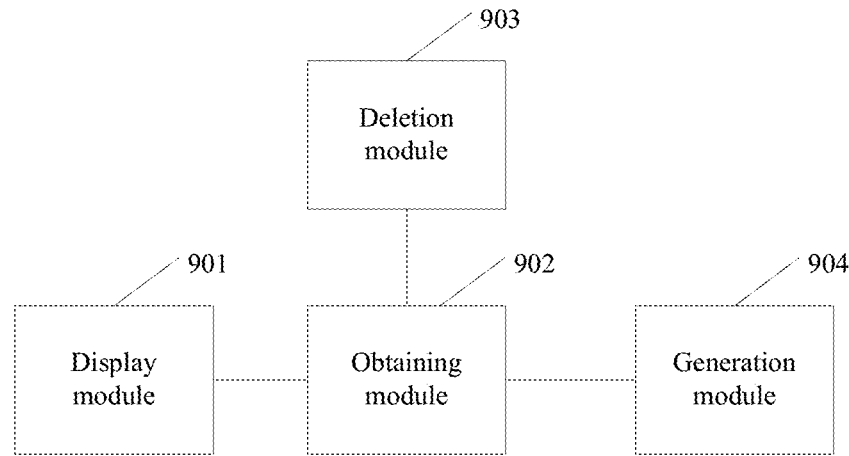
FIG. 9 is a schematic diagram of an embodiment of a mobile terminal according to an embodiment of this application.

The foregoing describes the file processing method of this application, and the following describes the mobile terminal of this application. Referring to FIG. 9, an embodiment of the mobile terminal in this application includes: a display module 901, configured to: in response to a first operation, display a first file on a first screen of a first application; an obtaining module 902, further configured to obtain a second operation entered by a user on the first screen, where the display module 901 is further configured to: in response to the second operation, display the first file on a recycle bin screen of the first application; a deletion module 903, configured to delete a first data table, where the first file is invisible to the user on the recycle bin screen of the first application due to deletion of the first data table, where the obtaining module 902 is further configured to obtain a third operation entered by the user; and a generation module 904, configured to: in response to the third operation, generate a second data table, where the first file is visible to the user on the recycle bin screen of the first application due to existence of the second data table.

In this embodiment of this application, after a recycle bin data table is deleted, the mobile terminal can generate a new recycle bin data table by using the generation module 904, so that the mobile terminal can still display the first file on the recycle bin screen after application data is cleared, and the user can permanently delete or recover the first file on the recycle bin screen, thereby improving user experience.

Optionally, in some embodiments, before the obtaining module 902 obtains the second operation, the first file belongs to a first album of the first application; and after the obtaining module 902 obtains the second operation, the first file belongs to a recycle bin album of the first application; and after the generation module 904 generates the second data table, the display module 901 is further configured to display the first file on the recycle bin screen of the first application; the obtaining module 902 is further configured to obtain a fourth operation entered by the user on the recycle bin screen; the display module 901 is configured to display, in response to the fourth operation, the first file on a screen corresponding to a first album of the first application; and after the obtaining module 902 obtains the fourth operation, the first file belongs to the first album of the first application.

Optionally, in some embodiments, before the obtaining module 902 obtains the second operation, the first file belongs to a first album of the first application; and after the obtaining module 902 obtains the second operation, the first file belongs to a recycle bin album of the first application; and after the generation module 904 generates the second data table, the display module 901 is further configured to display the first file on the recycle bin screen of the first application; the obtaining module 902 is further configured to obtain a fourth operation entered by the user on the recycle bin screen; and the display module 901 is further configured to: in response to the fourth operation, display the first file on a screen corresponding to a target album of the first application; and after the obtaining module 902 obtains the fourth operation, the first file belongs to the target album of the first application.

Optionally, in some embodiments, after the generation module 904 generates the second data table, the display module 901 is further configured to display the first file on the recycle bin screen of the first application; the obtaining module 902 is further configured to obtain a fifth operation entered by the user on the recycle bin screen; and the deletion module 903 is further configured to: in response to the fifth operation, delete the first file from the mobile terminal.

Optionally, in some embodiments, after the generation module 904 generates the second data table, the obtaining module 902 is further configured to obtain a sixth operation entered by the user, and in response to the sixth operation, display metadata of the first file; and the display module 901 is further configured to: in response to the sixth operation, display metadata of the first file, where the metadata includes at least one of the following: an original filename of the first file, an original file identifier of the first file, a deletion time of the first file, a source storage path of the first file, a current storage path of the first file, a date taken time of the first file, a picture orientation of the first file, a cloud globally unique identifier of the first file, a hash value of the first file, and a cloud identifier of a source album to which the first file belongs.

Optionally, in some embodiments, the display module 901 is further configured to: in response to a third operation, skip displaying a second file on the recycle bin screen of the first application, where the second file is a file that is the same as the first file and that is stored on a cloud server.

Optionally, in some embodiments, after the generation module 904 generates the second data table, the display module 901 is further configured to display a selection screen; the obtaining module 902 is further configured to obtain a seventh operation entered by the user on the selection screen; and the display module 901 is further configured to: in response to the seventh operation, display the first file on the recycle bin screen of the first application.

Optionally, in some embodiments, the mobile terminal further includes: a processing module, configured to change a storage location of the first file from a first directory to a second directory, and change a filename of the first file from a first name to a second name, where the second directory is used to store a file displayed on the recycle bin screen of the first application.

Optionally, in some embodiments, the second name is a target character string obtained by encoding the metadata of the first file by using a preset coding scheme; and the generation module 904 is specifically configured to: obtain the metadata of the first file by decoding the second name by using the preset coding scheme; and generate the second data table based on the metadata.

Optionally, in some embodiments, the second name is the deletion time of the first file; and the mobile terminal further includes: a processing module, configured to: obtain a target character string by encoding the metadata of the first file by using a preset coding scheme, and store the target character string and the deletion time of the first file in correspondence in a binary file of the second directory.

Optionally, in some embodiments, the generation module 904 is specifically configured to: determine the deletion time of the first file based on the second name; determine a target character string, in the second binary file, corresponding to the deletion time of the first file; obtain the metadata of the first file by decoding the target character string by using the preset coding scheme; and generate the second data table based on the metadata.

Optionally, in some embodiments, the mobile terminal further includes a backup module, configured to back up the first data table to obtain a third data table; and the generation module 904 is specifically configured to generate the second data table based on the third data table.

It should be understood that procedures executed by the modules of the mobile terminal corresponding to FIG. 9 are similar to the method procedures described in the embodiment shown in FIG. 2. Details are not described herein again.

Figure 10:
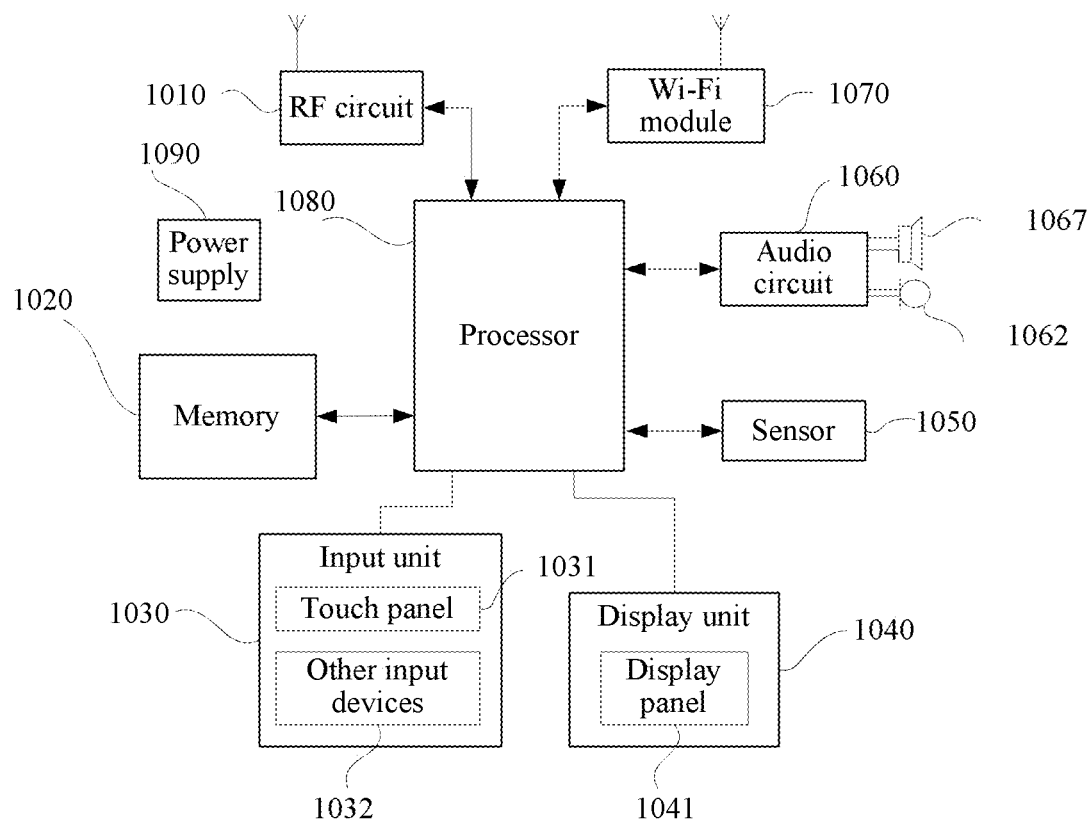
FIG. 10 is a schematic diagram of another embodiment of a mobile terminal according to an embodiment of this application.

The foregoing describes the mobile terminal in this application from a perspective of functional modules. The following describes the terminal in this application from a perspective of physical hardware. As shown in FIG. 10, for ease of description, only parts related to this embodiment of the present invention are illustrated. For specific technical details not disclosed, refer to the method embodiments of this application. The mobile terminal may be any terminal device, including a mobile phone, a tablet computer, a PDA (Personal Digital Assistant, personal digital assistant), a POS (Point of Sale, point of sale), an in-vehicle computer, or the like. For example, the terminal is a mobile phone.

FIG. 10 is a block diagram of a partial structure of a mobile phone related to the terminal provided by embodiments of the present invention. Referring to FIG. 10, the mobile phone includes components such as a radio frequency (Radio Frequency, RF) circuit 1010, a memory 1020, an input unit 1030, a display unit 1040, a sensor 1050, an audio circuit 1060, a Wireless Fidelity (wireless fidelity, Wi-Fi) module 1070, a processor 1080, and a power supply 1090. Persons skilled in the art may understand that the mobile phone structure shown in FIG. 10 does not constitute any limitation on the mobile phone, and the mobile phone may include more or fewer components than those shown in the figure, or a combination of some components, or different arrangements of components.

Components of the mobile phone are described in detail below with reference to FIG. 10.

The RF circuit 1010 may be configured to receive and send information, or receive and send signals during a call, and particularly, receive downlink information from a base station, and then send the downlink information to the processor 1080 for processing. In addition, the RF circuit 1010 sends related uplink data to the base station. Usually, the RF circuit 1010 includes but is not limited to an antenna, at least one amplifier, a transceiver, a coupler, a low noise amplifier (Low Noise Amplifier, LNA), a duplexer, and the like. In addition, the RF circuit 1010 may also communicate with a network and another device through radio communication. Any communication standard or protocol may be used for the radio communication, including but not limited to the Global System for Mobile Communications (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), e-mail, short message service (Short Messaging Service, SMS), and the like.

The memory 1020 may be configured to store software programs and modules. The processor 1080 executes various function applications and processes data of the mobile phone by running the software programs and the modules stored in the memory 1020. The memory 1020 may mainly include a program storage area and a data storage area. The program storage area may store an operating system, an application program required for at least one function (such as a sound playback function and an image playback function), and the like. The data storage area may store data that is created based on use of the mobile phone (such as audio data and a phone book), and the like. In addition, the memory 1020 may include a high-speed random access memory, or may further include a non-volatile memory, for example, at least one disk storage device, a flash memory device, or another volatile solid-state storage device.

The input unit 1030 may be configured to receive entered digit or character information, and generate key signal input related to user setting and function control of the mobile phone. Specifically, the input unit 1030 may include a touch panel 1031 and other input devices 1032. The touch panel 1031, also referred to as a touchscreen, can collect a touch operation performed by the user on or near the touch panel 1031 (for example, an operation performed by a user on the touch panel 1031 or near the touch panel 1031 by using a finger, a stylus, or any other proper object or accessory), and drive a corresponding connection device according to a preset program. Optionally, the touch panel 1031 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touchpoint coordinates, then sends the touchpoint coordinates to the processor 1080, and can receive a command sent by the processor 1080 and execute the command. In addition, the touch panel 1031 may be implemented in a plurality of types, such as a resistive type, a capacitive type, an infrared type, and a surface acoustic wave type. The input unit 1031 may further include the other input devices 1032 in addition to the touch panel 1030. Specifically, the other input devices 1032 may include but are not limited to one or more of a physical keyboard, a function key (such as a volume control key or a power key), a trackball, a mouse, a joystick, and the like.

The display unit 1040 may be configured to display information entered by a user or information provided for a user, and various menus of the mobile phone. The display unit 1040 may include a display panel 1041. Optionally, the display panel 1041 may be configured in a form of, for example, a liquid crystal display (Liquid Crystal Display, LCD) or an organic light-emitting diode (Organic Light-Emitting Diode, OLED). Further, the touch panel 1031 may cover the display panel 1041. After detecting a touch operation on or near the touch panel 1031, the touch panel 1031 transfers information about the touch operation to the processor 1080 to determine a touch event type. Then the processor 1080 provides corresponding visual output on the display panel 1041 based on the touch event type. Although in FIG. 10, the touch panel 1031 and the display panel 1041 are used as two separate components to implement input and input functions of the mobile phone, in some embodiments, the touch panel 1031 may be integrated with the display panel 1041 to implement the input and output functions of the mobile phone.

The mobile phone may further include at least one sensor 1050, for example, a light sensor, a motion sensor, or other sensors. Specifically, the light sensor may include an ambient light sensor and a proximity sensor. The ambient light sensor may adjust luminance of the display panel 1041 based on brightness of ambient light. The proximity sensor may turn off the display panel 1041 and/or backlight when the mobile phone moves close to an ear. As a type of motion sensor, an accelerometer sensor may detect values of acceleration in various directions (usually, there are three axes), may detect, in a static state, a value and a direction of gravity, and may be used for an application that recognizes mobile phone postures (for example, screen switching between a landscape mode and a portrait mode, a related game, and magnetometer posture calibration), a vibration recognition-related function (for example, a pedometer and tapping), and the like. Other sensors that can be configured on the mobile phone such as a gyroscope, a barometer, a hygrometer, a thermometer, and an infrared sensor are not described herein.

The audio circuit 1060, a loudspeaker 1061, and a microphone 1062 may provide an audio interface between a user and the mobile phone. The audio circuit 1060 may transmit, to the speaker 1061, an electrical signal that is obtained through conversion of received audio data, and the speaker 1061 converts the electrical signal into a sound signal and outputs the sound signal. In addition, the microphone 1062 converts a collected sound signal into an electrical signal; the audio circuit 1060 receives the electrical signal and converts the electrical signal into audio data, and outputs the audio data to the processor 1080 for processing; and processed audio data is sent to, for example, another mobile phone by using the RF circuit 1010, or the audio data is output to the memory 1020 for further processing.

Wi-Fi is a short-range wireless transmission technology. By using the Wi-Fi module 1070, the mobile phone may help a user, for example, send/receive an email, browse a web page, and access streaming media. The Wi-Fi module 1070 provides wireless broadband Internet access for the user. Although FIG. 10 shows the Wi-Fi module 1070, it can be understood that the Wi-Fi module 1070 is not a necessary constituent of the mobile phone and may be omitted as required provided that the essence of the present invention is not changed.

The processor 1080 is a control center of the mobile phone, and connects various parts of the entire mobile phone by using various interfaces and lines. The processor 1080 executes various functions of the mobile phone and processes data by running or executing the software programs and/or the modules stored in the memory 1020, and calling data stored in the memory 1020, so as to monitor the entire mobile phone. Optionally, the processor 1080 may include one or more processing units. An application processor and a modem processor may be integrated into the processor 1080. The application processor mainly processes an operating system, a user interface, an application program, and the like. The modem processor mainly processes wireless communication. It can be understood that the modem processor may alternatively not be integrated into the processor 1080.

The mobile phone further includes the power supply 1090 (for example, a battery) that supplies power to the components. The power supply may be logically connected to the processor 1080 by using a power management system, so as to implement functions such as charging management, discharging management, and power consumption management by using the power management system.

Although not shown, the mobile phone may further include a camera, a Bluetooth module, and the like. Further details are not described herein.

The steps performed by the mobile terminal in the foregoing embodiments may be based on the structure of the mobile terminal shown in FIG. 10.

An embodiment of this application further provides a computer storage medium. The computer storage medium is used to store a computer software instruction for use by the terminal, and the computer software instruction includes a program designed for execution of the mobile terminal.

An embodiment of this application further provides a computer program product. The computer program product includes a computer software instruction, and the computer software instruction may be loaded by using a processor to implement the procedure in the file processing method in FIG. 2.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a web site, computer, server, or data center to another website, computer, server, or data center in a wired (for example, through a coaxial cable, an optical fiber, or a digital subscriber line (DSL)) or wireless (for example, through infrared, radio, microwave, or the like) manner. The computer readable storage medium may be any usable medium accessible by a computer or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

It can be clearly understood by persons skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division or may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected depending on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (English full name: Read-Only Memory, ROM for short), a random access memory (English full name: Random Access Memory, RAM for short), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A method implemented by a mobile terminal, wherein the method comprises:
    obtaining a first operation from a user;
    displaying, in response to the first operation, a first file on a first screen of a first application;
    obtaining a second operation from the user on the first screen;

changing, in response to the second operation, a storage location of the first file from a first directory to a second directory to display the first file on a recycle bin screen of the first application, wherein the second directory is configured to store one or more files displayed on the recycle bin screen;

encoding, by using a preset coding scheme, metadata of the first file to obtain a target character string;

changing a filename of the first file from a first name to a second name, wherein the second name is the target character string;

deleting, after displaying the first file on the recycle bin screen, a first data table to remove the first file from view of the user on the recycle bin screen;

obtaining, after deleting the first data table, a third operation from the user;

obtaining, in response to the third operation, the metadata by decoding the second name by using the preset coding scheme; and generating, based on the metadata, a second data table to make the first file visible to the user on the recycle bin screen.

2. The method of claim 1, wherein before obtaining the second operation, the first file belongs to a first album of the first application, wherein after generating the second data table, the method further comprises:
   displaying the first file on the recycle bin screen;
   obtaining a fourth operation from the user on the recycle bin screen; and
   displaying, in response to the fourth operation, the first file on a second screen corresponding to the first album, and
   wherein the first file belongs to the first album after obtaining the fourth operation.

3. The method of claim 1, wherein after generating the second data table, the method further comprises:
   displaying the first file on the recycle bin screen;
   obtaining a fourth operation from the user on the recycle bin screen; and
   deleting, in response to the fourth operation, the first file from the mobile terminal.

4. The method of claim 1, further comprising storing the metadata in the second data table, wherein the metadata comprises:
   an original filename of the first file;
   an original file identifier of the first file;
   a deletion time of the first file;
   a source storage path of the first file;
   a current storage path of the first file;
   a date taken time of the first file;
   a picture orientation of the first file;
   a cloud globally unique identifier of the first file;
   a hash value of the first file; or
   a cloud identifier of a source album to which the first file belongs.

5. A mobile terminal, comprising:
   one or more processors; and
   a memory coupled to the one or more processors and configured to store instructions that, when executed by the one or more processors, cause the mobile terminal to:
      obtain a first operation from a user;
      display, in response to the first operation, a first file on a first screen of a first application;
      obtain a second operation from the user on the first screen;
      change, in response to the second operation, a storage location of the first file from a first directory to a second directory to display the first file on a recycle bin screen of the first application, wherein the second directory is configured to store one or more files displayed on the recycle bin screen;
      encode, by using a preset coding scheme, metadata of the first file to obtain a target character string;
      change a filename of the first file from a first name to a second name, wherein the second name is the target character string;
      delete, after displaying the first file on the recycle bin screen, a first data table to remove the first file from view of the user on the recycle bin screen;
      obtain, after deleting the first data table, a third operation from the user;
      obtain, in response to the third operation, the metadata by decoding the second name by using the preset coding scheme; and
      generate, based on the metadata, a second data table to make the first file visible to the user on the recycle bin screen.

6. The mobile terminal of claim 5, wherein before obtaining the second operation, the first file belongs to a first album of the first application, wherein after generating the second data table, the one or more processors further execute the instructions to cause the mobile terminal to:
   display the first file on the recycle bin screen;
   obtain a fourth operation from the user on the recycle bin screen; and
   display, in response to the fourth operation, the first file on a second screen corresponding to the first album, and
   wherein the first file belongs to the first album after obtaining the fourth operation.

7. The mobile terminal of claim 5, wherein before obtaining the second operation, the first file belongs to a first album of the first application, wherein after generating the second data table, the one or more processors further execute the instructions to cause the mobile terminal to:
   display the first file on the recycle bin screen;
   obtain a fourth operation from the user on the recycle bin screen; and
   display, in response to the fourth operation, the first file on a second screen corresponding to a target album of the first application, and
   wherein the first file belongs to the target album after obtaining the fourth operation.

8. The mobile terminal of claim 5, wherein after generating the second data table, the one or more processors further execute the instructions to cause the mobile terminal to:
   display the first file on the recycle bin screen;
   obtain a fourth operation from the user on the recycle bin screen; and
   delete, in response to the fourth operation, the first file from the mobile terminal.

9. The mobile terminal of claim 5, wherein the one or more processors further execute the instructions to cause the mobile terminal to store the metadata of the first file in the second data table, and wherein the metadata comprises:
   an original filename of the first file;
   an original file identifier of the first file;
   a deletion time of the first file;
   a source storage path of the first file;
   a current storage path of the first file;
   a date taken time of the first file;
   a picture orientation of the first file;

a cloud globally unique identifier of the first file;
a hash value of the first file; or
a cloud identifier of a source album to which the first file belongs.

10. A computer program product comprising instructions stored on a non-transitory computer-readable medium that, when executed by one or more processors, cause a mobile terminal to:
obtain a first operation from a user;
display, in response to the first operation, a first file on a first screen of a first application;
obtain a second operation from the user on the first screen;
change, in response to the second operation, a storage location of the first file from a first directory to a second directory to display the first file on a recycle bin screen of the first application, wherein the second directory is configured to store one or more files displayed on the recycle bin screen;
encode, by using a preset coding scheme, metadata of the first file to obtain a target character string;
change a filename of the first file from a first name to a second name, wherein the second name is the target character string;
delete, after displaying the first file on the recycle bin screen, a first data table to remove the first file from view of the user on the recycle bin screen;
obtain, after deleting the first data table, a third operation from the user;
obtain, in response to the third operation, the metadata by decoding the second name by using the preset coding scheme; and
generate, based on the metadata, a second data table to make the first file visible to the user on the recycle bin screen.

11. The computer program product of claim 10, wherein before obtaining the second operation, the first file belongs to a first album of the first application, wherein after generating the second data table, the one or more processors further execute the instructions to cause the mobile terminal to:
display the first file on the recycle bin screen;
obtain a fourth operation from the user on the recycle bin screen; and
display, in response to the fourth operation, the first file on a second screen corresponding to the first album, and
wherein the first file belongs to the first album after obtaining the fourth operation.

12. The computer program product of claim 10, wherein before obtaining the second operation, the first file belongs to a first album of the first application, wherein after generating the second data table, the one or more processors further execute the instructions to cause the mobile terminal to:
display the first file on the recycle bin screen;
obtain a fourth operation from the user on the recycle bin screen; and
display, in response to the fourth operation, the first file on a second screen corresponding to a target album of the first application, and
wherein the first file belongs to the target album after obtaining the fourth operation.

13. The computer program product of claim 10, wherein after generating the second data table, the one or more processors further execute the instructions to cause the mobile terminal to:
display the first file on the recycle bin screen;
obtain a fourth operation from the user on the recycle bin screen; and
delete, in response to the fourth operation, the first file from the mobile terminal.

14. The computer program product of claim 10, wherein the one or more processors further execute the instructions to cause the mobile terminal to store the metadata in the second data table, and wherein the metadata comprises:
an original filename of the first file;
an original file identifier of the first file;
a deletion time of the first file;
a source storage path of the first file; or
a current storage path of the first file.

15. The computer program product of claim 10, wherein the one or more processors further execute the instructions to cause the mobile terminal to store the metadata in the second data table.

16. The computer program product of claim 15, wherein the metadata comprises a date taken time of the first file.

17. The computer program product of claim 15, wherein the metadata comprises a picture orientation of the first file.

18. The computer program product of claim 15, wherein the metadata comprises a cloud globally unique identifier of the first file.

19. The computer program product of claim 15, wherein the metadata comprises a hash value of the first file.

20. The computer program product of claim 15, wherein the metadata comprises a cloud identifier of a source album to which the first file belongs.

* * * * *

UNITED STATES PATENT AND TRADEMARK OFFICE
CERTIFICATE OF CORRECTION

PATENT NO. : 11,868,314 B2  
APPLICATION NO. : 17/939243  
DATED : January 9, 2024  
INVENTOR(S) : Tangsuo Li et al.

Page 1 of 1

It is certified that error appears in the above-identified patent and that said Letters Patent is hereby corrected as shown below:

On the Title Page

Page 2, item (56): "IN 101287190 A 10/2008" should read "CN 101287190 A 10/2008"

Signed and Sealed this  
Twenty-seventh Day of February, 2024

Katherine Kelly Vidal  
*Director of the United States Patent and Trademark Office*